(12) United States Patent
Miyazaki

(10) Patent No.: US 9,835,871 B2
(45) Date of Patent: Dec. 5, 2017

(54) ANTI-VIBRATION OPTICAL SYSTEM

(71) Applicant: Nikon Vision Co., Ltd., Shinagawa-ku, Tokyo (JP)

(72) Inventor: Yosuke Miyazaki, Ichihara (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 14/991,970

(22) Filed: Jan. 10, 2016

(65) Prior Publication Data

US 2016/0124243 A1 May 5, 2016

Related U.S. Application Data

(63) Continuation-in-part of application No. PCT/JP2014/068159, filed on Jul. 8, 2014.

(30) Foreign Application Priority Data

Jul. 11, 2013 (JP) .................................. 2013-145543

(51) Int. Cl.
*G02B 15/14* (2006.01)
*G02B 27/64* (2006.01)
(Continued)

(52) U.S. Cl.
CPC ............ *G02B 27/646* (2013.01); *G02B 13/02* (2013.01); *G02B 17/045* (2013.01); *G02B 23/02* (2013.01); *G03B 2205/0007* (2013.01)

(58) Field of Classification Search
CPC ...... G02B 27/64; G02B 27/646; G02B 13/02; G03B 2205/0007; G03B 2205/0015
(Continued)

(56) References Cited

U.S. PATENT DOCUMENTS 4,844,602 A * 7/1989 Kitagishi ............. G02B 27/646
356/248
6,198,575 B1 3/2001 Yano
(Continued)

FOREIGN PATENT DOCUMENTS

JP 02-146014 A 6/1990
JP 10-186228 A 7/1998
(Continued)

OTHER PUBLICATIONS

English machine translation of JP 2008180964 A.*
(Continued)

*Primary Examiner* — Thomas K Pham
*Assistant Examiner* — Nicholas R Pasko
(74) *Attorney, Agent, or Firm* — Shapiro, Gabor and Rosenberger, PLLC

(57) ABSTRACT

An anti-vibration optical system is an observation optical system including, in sequence from an object side, an objective optical system, an erecting prism, and an ocular optical system, wherein: in sequence from the object side, the objective optical system includes a first lens group having a positive refracting power and a second lens group having a negative refracting power; in sequence from the object side, the second lens group comprises a positive lens group having a positive refracting power and a negative lens group having a negative refracting power; and an image position can be changed by the negative lens group of the second lens group being displaced in a direction orthogonal to an optical axis.

9 Claims, 25 Drawing Sheets

FIRST EXAMPLE

(51) Int. Cl.
  *G02B 13/02* (2006.01)
  *G02B 23/02* (2006.01)
  *G02B 17/04* (2006.01)

(58) Field of Classification Search
  USPC .................................. 359/557, 692, 795
  See application file for complete search history.

(56) References Cited

U.S. PATENT DOCUMENTS

| | | | |
|---|---|---|---|
| 6,377,399 B1 | 4/2002 | Yanari | |
| 6,781,755 B2 * | 8/2004 | Yoneyama | G02B 27/646 |
| | | | 359/431 |
| 6,919,998 B2 * | 7/2005 | Momoki | G02B 27/646 |
| | | | 359/680 |
| 8,194,318 B2 * | 6/2012 | Yamada | G02B 27/646 |
| | | | 359/399 |
| 2001/0055155 A1 | 12/2001 | Kanai et al. | |

FOREIGN PATENT DOCUMENTS

| | | | |
|---|---|---|---|
| JP | 11-264942 A | | 9/1999 |
| JP | 2000-089104 A | | 3/2000 |
| JP | 2001-116989 A | | 4/2001 |
| JP | 2007156252 A | * | 6/2007 |
| JP | 2008-040065 A | | 2/2008 |
| JP | 2008-089659 A | | 4/2008 |
| JP | 2008-180964 A | | 8/2008 |
| JP | 2008180964 A | * | 8/2008 |

OTHER PUBLICATIONS

International Search Report from International Patent Application No. PCT/JP2014/068159, dated Sep. 9, 2014.
International Preliminary Report on Patentability from International Patent Application No. PCT/JP2014/068159, dated Jan. 21, 2016.

* cited by examiner

FIG.2 FIRST EXAMPLE: AFOCAL ABERRATION DIAGRAM

FIG.3 ABERRATION DIAGRAM OF OBJECTIVE OPTICAL SYSTEM OF FIRST EXAMPLE (WITHOUT IMAGE SHAKE CORRECTION)

FIG.4 ABERRATION DIAGRAM OF OBJECTIVE OPTICAL SYSTEM OF FIRST EXAMPLE (WITH IMAGE SHAKE CORRECTION AMOUNT 0.5°)

SECOND EXAMPLE

FIG.8 ABERRATION DIAGRAM OF OBJECTIVE OPTICAL SYSTEM OF SECOND EXAMPLE (WITHOUT IMAGE SHAKE CORRECTION)

FIG.9 ABERRATION DIAGRAM OF OBJECTIVE OPTICAL SYSTEM OF SECOND EXAMPLE
(IMAGE SHAKE CORRECTION AMOUNT 0.6°)

FIG.10 ABERRATION DIAGRAM OF OBJECTIVE OPTICAL SYSTEM OF SECOND EXAMPLE (IMAGE SHAKE CORRECTION AMOUNT 0.6°)

THIRD EXAMPLE

FIG.12
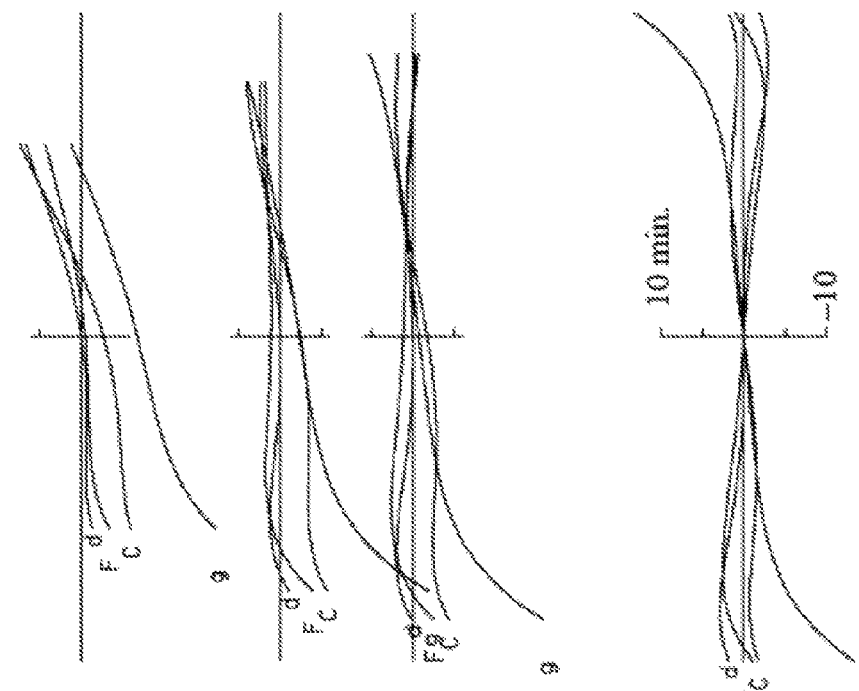
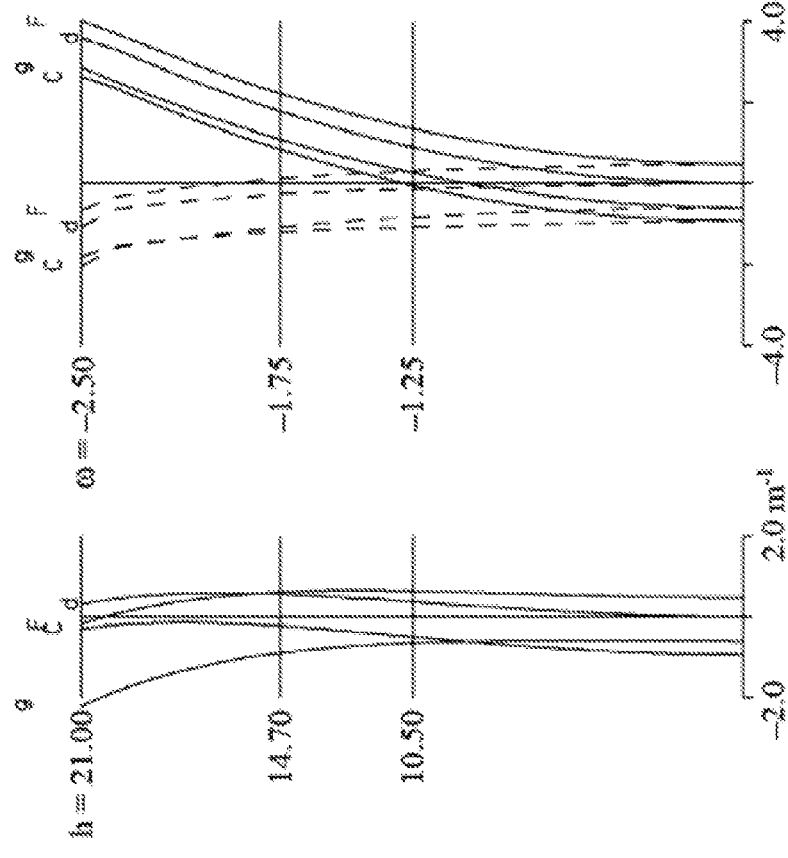
THIRD EXAMPLE: AFOCAL ABERRATION DIAGRAM

FIG.13 ABERRATION DIAGRAM OF OBJECTIVE OPTICAL SYSTEM OF THIRD EXAMPLE (WITHOUT IMAGE SHAKE CORRECTION)

FIG.14 ABERRATION DIAGRAM OF OBJECTIVE OPTICAL SYSTEM OF THIRD EXAMPLE (IMAGE SHAKE CORRECTION AMOUNT 0.5°)

FIG.15 ABERRATION DIAGRAM OF OBJECTIVE OPTICAL SYSTEM OF THIRD EXAMPLE (IMAGE SHAKE CORRECTION AMOUNT 0.5°)

FOURTH EXAMPLE

FIG.17 FOURTH EXAMPLE: AFOCAL ABERRATION DIAGRAM

FIG.18 ABERRATION DIAGRAM OF OBJECTIVE OPTICAL SYSTEM OF FOURTH EXAMPLE (WITHOUT IMAGE SHAKE CORRECTION)

FIG.19 ABERRATION DIAGRAM OF OBJECTIVE OPTICAL SYSTEM OF FOURTH EXAMPLE (IMAGE SHAKE CORRECTION AMOUNT 0.5°)

FIFTH EXAMPLE

FIFTH EXAMPLE: AFOCAL ABERRATION DIAGRAM

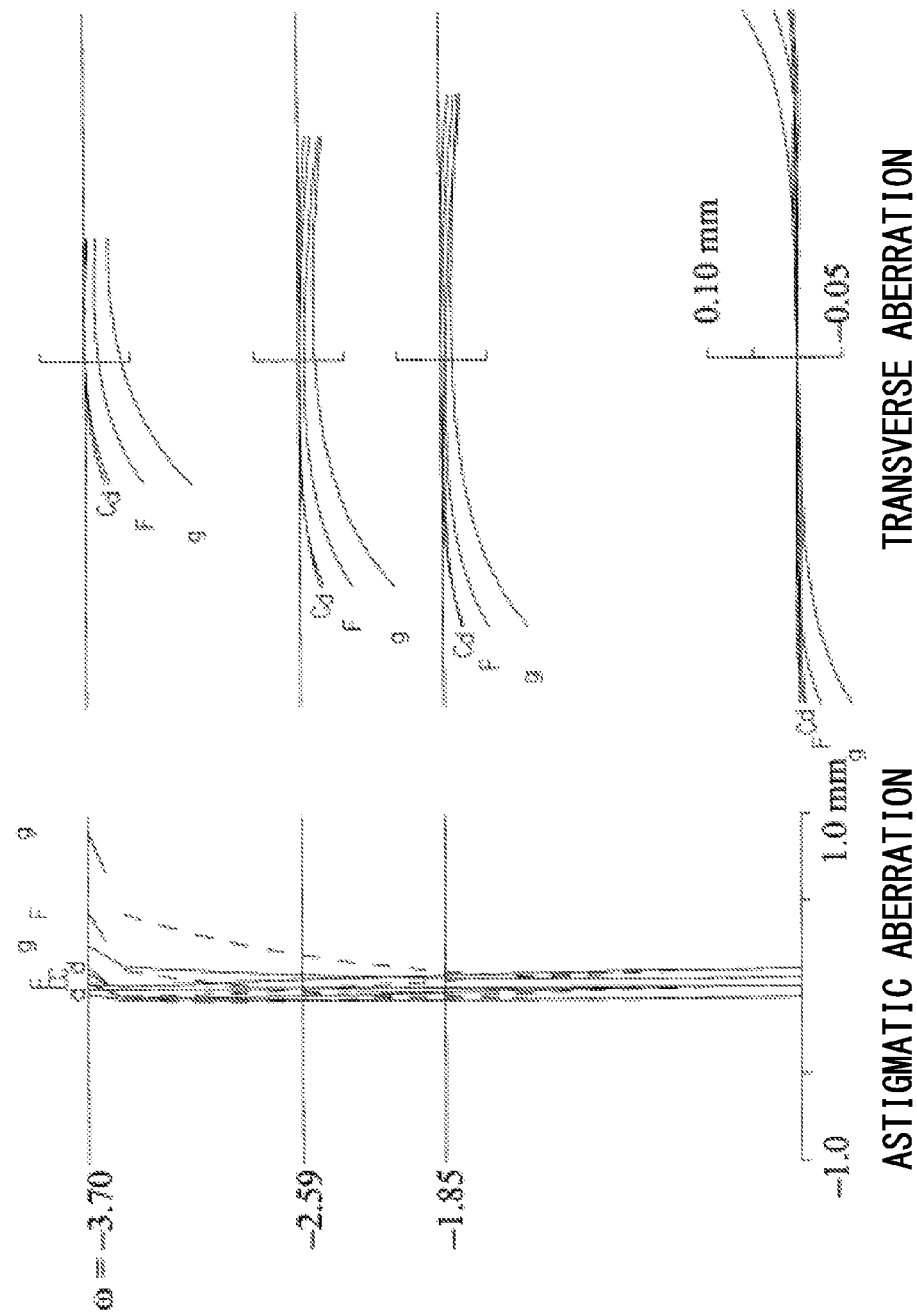

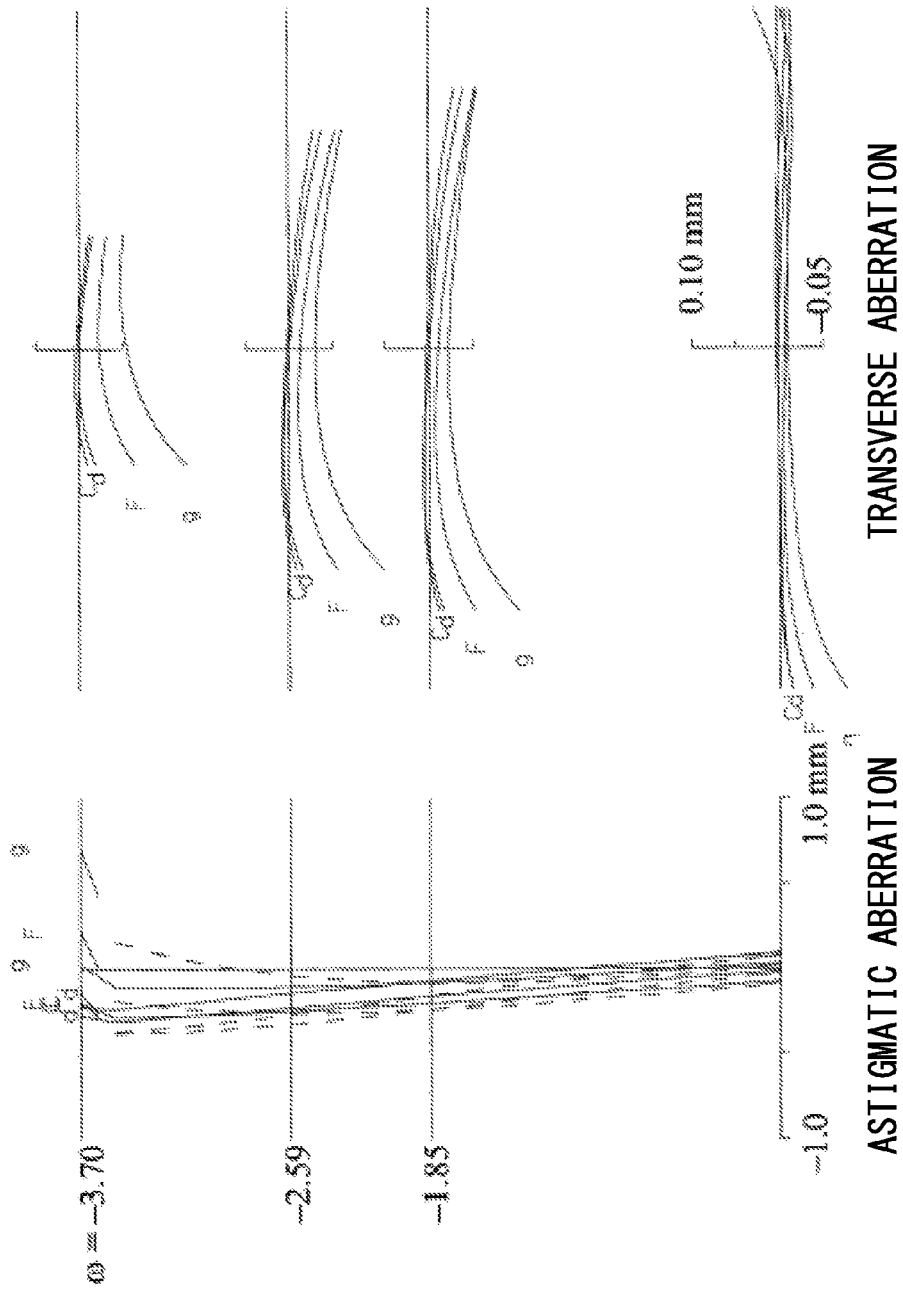

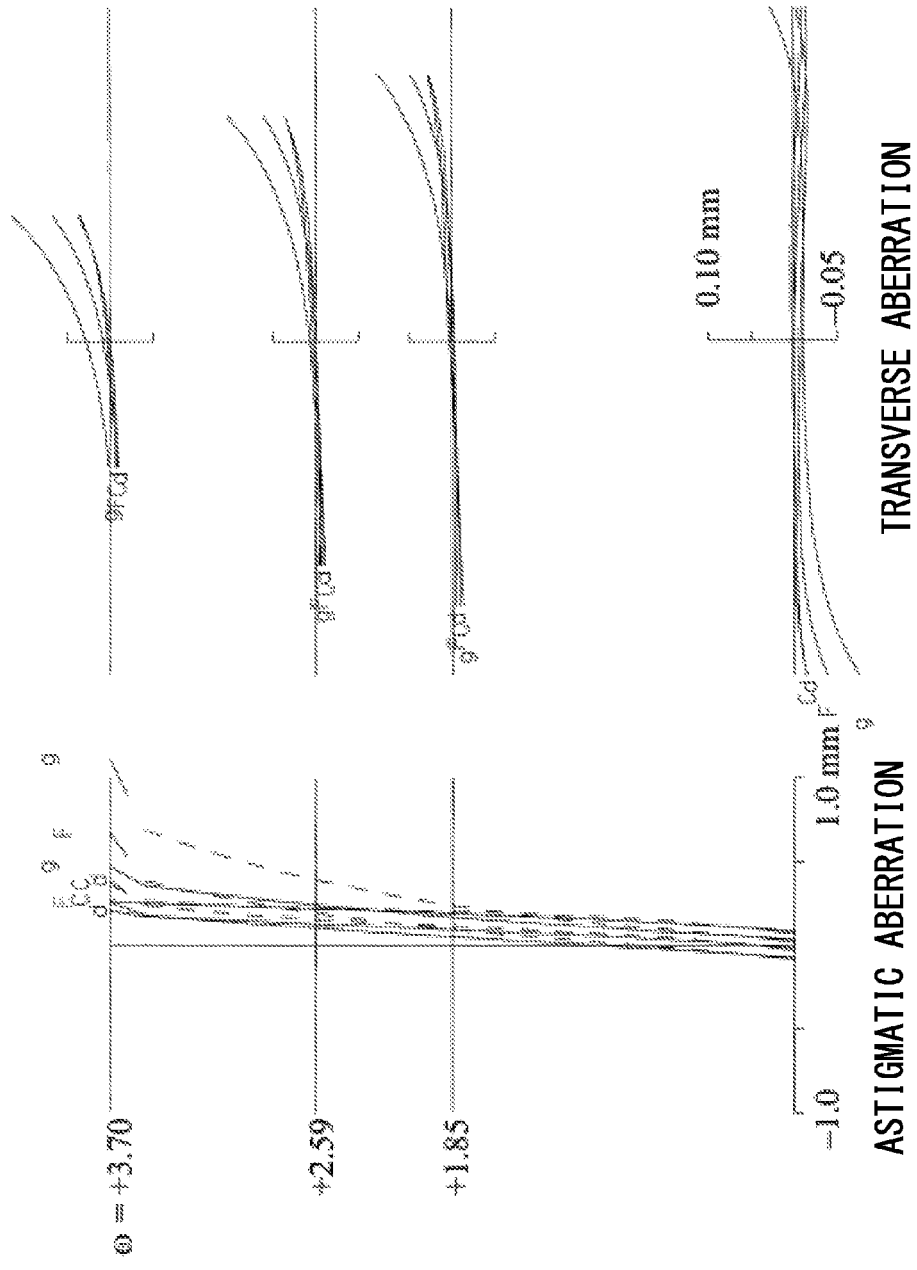

ANTI-VIBRATION OPTICAL SYSTEM

This application is a continuation in part of International Application No. PCT/JP2014/068159 filed Jul. 8, 2014.

INCORPORATION BY REFERENCE

The disclosures of the following priority application and the International Application are herein incorporated by reference:
Japanese Patent Application No. 2013-145543 filed Jul. 11, 2013; and
International Application No. PCT/JP2014/068159 filed Jul. 8, 2014.

BACKGROUND OF THE INVENTION

1. Field of the Invention

The present invention relates to an anti-vibration optical system.

2. Description of Related Art

In the prior art, proposals have been advanced for various optical systems incorporating means that correct image blurring (i.e. image shake) caused by vibration such as camera shaking or the like by eccentrically decentering a lens in the optical system. In particular, as an observation optical system, an optical system that is capable of correcting image shake with a simple structure is disclosed in Japanese Laid-Open Patent Publication Heisei 10-186228.

SUMMARY OF THE INVENTION

However, with the observation optical system described in Japanese Laid-Open Patent Publication Heisei 10 186228, there is the problem that the required amount of lens group eccentric displacement for correcting the image shake amount is relatively great, so that the optical performance deteriorates due to eccentric aberration. Moreover, an eccentric displacement mechanism using a VCM (Voice Coil Motor) that is arranged so as to surround the external periphery of the lens is often employed as a means for displacing (i.e. decentering) the lens in a direction orthogonal to the optical axis. When an eccentric mechanism of this type is employed there is the problem that, if the amount of image shake correction is to be made great, then the size of the casing of the optical system is undesirably increased, since it is necessary to make the diameter of the eccentric mechanism large; while, on the other hand, if the eccentric mechanism is to be made compact, then it becomes impossible to obtain a sufficient amount of shake correction.

According to the 1st aspect of the present invention, an anti-vibration optical system is an observation optical system comprising, in sequence from an object side, an objective optical system, an erecting prism, and an ocular optical system, wherein: in sequence from the object side, the objective optical system comprises a first lens group having a positive refracting power and a second lens group having a negative refracting power; in sequence from the object side, the second lens group comprises a positive lens group having a positive refracting power and a negative lens group having a negative refracting power; and an image position can be changed by the negative lens group of the second lens group being displaced in a direction orthogonal to an optical axis.

According to the 2nd aspect of the present invention, it is preferred that in the anti-vibration optical system according to the 1st aspect, the following conditions (1) and (2) are satisfied $$0.4 \le f_1/f \le 0.9 \quad (1)$$

$$0.5 \le |f_2/f| \le 1.4 \quad (2),$$

wherein
f is an focal length of the objective optical system
$f_1$ is an focal length of the first lens group, and
$f_2$ is an focal length of the second lens group.

According to the 3rd aspect of the present invention, it is preferred that in the anti-vibration optical system according to the 2nd aspect, the following conditions (3) and (4) are satisfied $$0.2 \le f_{22}/f_2 \le 0.6 \quad (3)$$

$$0.01 \le |D_2/f_2| \le 0.09 \quad (4),$$

wherein:
$f_2$ is the focal length of the second lens group
$f_{22}$ is an focal length of the negative lens group of the second lens group, and
$D_2$ is a gap between principal points of the positive lens group and the negative lens group of the second lens group.

According to the 4th aspect of the present invention, it is preferred that in the anti-vibration optical system according to the 1st aspect, the following condition (5) is satisfied $$-1.2 \le (r_2+r_1)/(r_2-r_1) \le -0.8 \quad (5),$$

wherein
$r_1$ is an object side radius of curvature of the negative lens group of the second lens group, and
$r_2$ is an eye point side radius of curvature of the negative lens group of the second lens group.

According to the 5th aspect of the present invention, it is preferred that in the anti-vibration optical system according to the 2nd aspect, the following condition (5) is satisfied $$-1.2 \le (r_2+r_1)/(r_2-r_1) \le -0.8 \quad (5),$$

wherein
$r_1$ is an object side radius of curvature of the negative lens group of the second lens group, and
$r_2$ is an eye point side radius of curvature of the negative lens group of the second lens group.

According to the 6th aspect of the present invention, it is preferred that in the anti-vibration optical system according to the 3rd aspect, the following condition (5) is satisfied $$-1.2 \le (r_2+r_1)/(r_2-r_1) \le -0.8 \quad (5),$$

wherein
$r_1$ is an object side radius of curvature of the negative lens group of the second lens group, and
$r_2$ is an eye point side radius of curvature of the negative lens group of the second lens group.

According to the 7th aspect of the present invention, it is preferred that in the anti-vibration optical system according to the 1st aspect, the negative lens group of the second lens group consists of a single negative lens, and the following condition (6) is satisfied $$\upsilon_{22} \ge 50 \quad (6),$$

wherein
$\upsilon_{22}$ is an Abbe number of the single negative lens.

According to the 8th aspect of the present invention, it is preferred that in the anti-vibration optical system according to the 2nd aspect, the negative lens group of the second lens group consists of a single negative lens, and the following condition (6) is satisfied $$\upsilon_{22} \ge 50 \quad (6),$$

wherein $\upsilon_{22}$ is an Abbe number of the single negative lens.

According to the 9th aspect of the present invention, it is preferred that in the anti-vibration optical system according to the 3rd aspect, the negative lens group of the second lens group consists of a single negative lens, and the following condition (6) is satisfied $$\upsilon_{22} \geq 50 \quad (6),$$

wherein $\upsilon_{22}$ is an Abbe number of the single negative lens.

According to the 10th aspect of the present invention, it is preferred that in the anti-vibration optical system according to the 4th aspect, the negative lens group of the second lens group consists of a single negative lens, and the following condition (6) is satisfied $$\upsilon_{22} \geq 50 \quad (6),$$

wherein $\upsilon_{22}$ is an Abbe number of the single negative lens.

According to the 11th aspect of the present invention, it is preferred that in the anti-vibration optical system according to the 5th aspect, the negative lens group of the second lens group consists of a single negative lens, and the following condition (6) is satisfied $$\upsilon_{22} \geq 50 \quad (6),$$

wherein $\upsilon_{22}$ is an Abbe number of the single negative lens.

According to the 12th aspect of the present invention, it is preferred that in the anti-vibration optical system according to the 6th aspect, the negative lens group of the second lens group consists of a single negative lens, and the following condition (6) is satisfied $$\upsilon_{22} \geq 50 \quad (6),$$

wherein $\upsilon_{22}$ is an Abbe number of the single negative lens.

According to the 13th aspect of the present invention, it is preferred that in the anti-vibration optical system according to the 1st aspect, focusing is performed by the positive lens group of the second lens group being displaced along a direction of the optical axis.

According to the 14th aspect of the present invention, it is preferred that in the anti-vibration optical system according to the 2nd aspect, focusing is performed by the positive lens group of the second lens group being displaced along a direction of the optical axis.

According to the 15th aspect of the present invention, it is preferred that in the anti-vibration optical system according to the 3rd aspect, focusing is performed by the positive lens group of the second lens group being displaced along a direction of the optical axis.

According to the 16th aspect of the present invention, it is preferred that in the anti-vibration optical system according to the 4th aspect, focusing is performed by the positive lens group of the second lens group being displaced along a direction of the optical axis.

According to the 17th aspect of the present invention, it is preferred that in the anti-vibration optical system according to the 5th aspect, focusing is performed by the positive lens group of the second lens group being displaced along a direction of the optical axis.

According to the 18th aspect of the present invention, it is preferred that in the anti-vibration optical system according to the 6th aspect, focusing is performed by the positive lens group of the second lens group being displaced along a direction of the optical axis.

According to the 19th aspect of the present invention, it is preferred that in the anti-vibration optical system according to the 7th aspect, focusing is performed by the positive lens group of the second lens group being displaced along a direction of the optical axis.

According to the 20th aspect of the present invention, it is preferred that in the anti-vibration optical system according to the 8th aspect, focusing is performed by the positive lens group of the second lens group being displaced along a direction of the optical axis.

BRIEF DESCRIPTION OF THE DRAWINGS

FIG. 12 is an aberration diagram of this observation optical system according to the third example;

FIG. 23 is an aberration diagram of an objective optical system according to the fifth example when image shake correction is not being performed;

FIG. 24 is an aberration diagram of this objective optical system according to the fifth example when an image shake correction amount of 0.6° is being performed; and FIG. 25 is another aberration diagram of this objective optical system according to the fifth example when an image shake correction amount of 0.6° is being performed.

DESCRIPTION OF EMBODIMENTS

Figure 1:
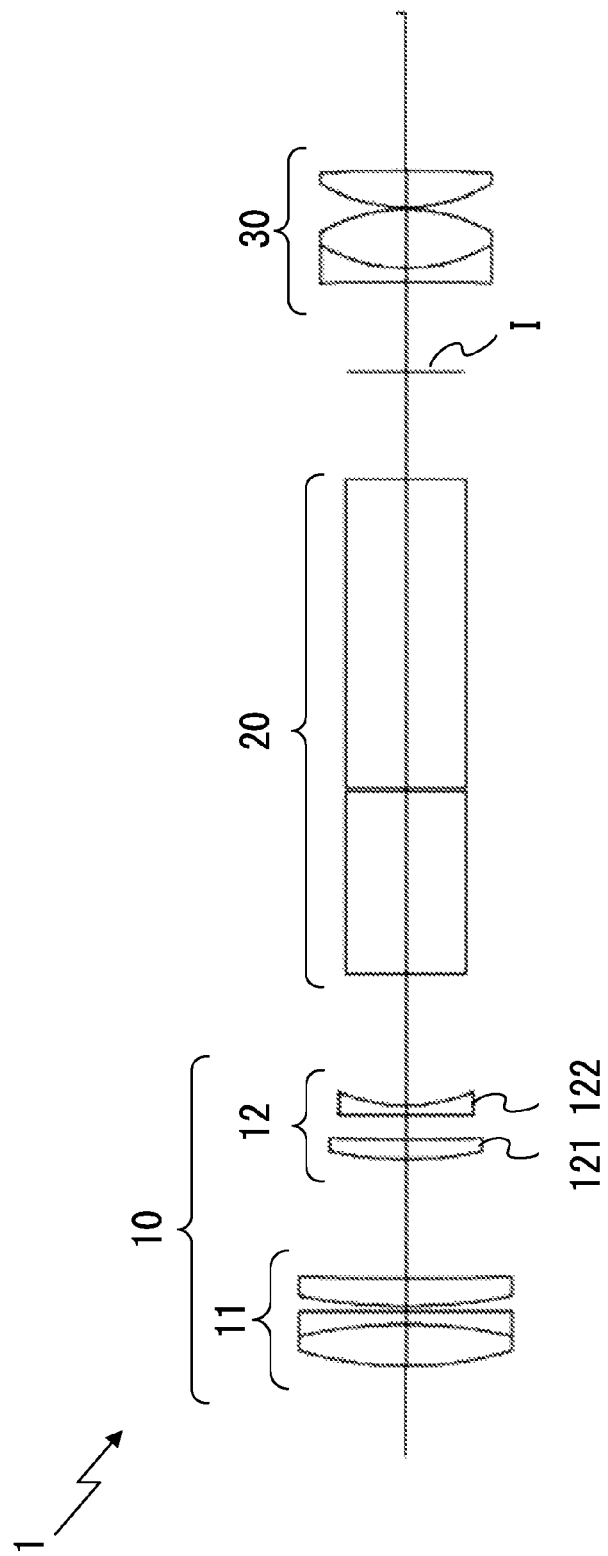
FIG. 1 is a figure for explanation of the structure of an observation optical system according to a first example.

In the following, embodiments of the present invention will be explained with reference to the drawings. FIG. 1 is a figure for explanation of the structure of an observation optical system 1 according to an embodiment of the present invention. This observation optical system is endowed with an anti-vibration function and thus is an anti-vibration optical system, and may be employed as an optical system for observation, such as, a telescope or binoculars, or of a laser rangefinder or the like. It should be understood that, in the case of use as binoculars, a binocular optical system is constructed by providing two of the observation optical system 1 as a left and right pair.

In sequence from the object side, this observation optical system comprises an objective optical system 10, an erecting prism 20, and an ocular optical system 30. Light from a photographic subject that is incident upon the observation optical system 1 passes through the objective optical system 10 and the erecting prism 20, and is focused into an image of the photographic subject (an erect image) at an image plane I. This image of the photographic subject that has been focused at the image plane I is magnified by the ocular optical system 30, and is observed by an observer.

The objective optical system 10 is of the so called telephoto type, and, in sequence from the object side, comprises a first lens group 11 that has a positive refracting power and a second lens group 12 that has a negative refracting power. Moreover, in sequence from the object side, the second lens group 12 comprises a positive lens group 121 that has a positive refracting power and a negative lens group 122 that has a negative refracting power. It should be understood that while, in FIG. 1, each of the positive lens group 121 and the negative lens group 122 is shown as consisting of a single lens, it would also be acceptable for either or both of them to comprise a plurality of lenses.

With the observation optical system 1 of this embodiment, it is arranged to change the image position and thus to correct image shake by displacing the negative lens group 122 of the second lens group 12 in a direction orthogonal to the optical axis (in other words, eccentrically with respect to the optical axis). Moreover, it is arranged to perform focusing of the observation optical system 1 by displacing the positive lens group 121 of the second lens group 12 along the direction of the optical axis.

When constructing an anti-vibration optical system for a telephoto type lens that has two lens groups, one at the front and one at the rear, as in the case of the objective optical system 10 of this embodiment, it may also be considered to arrange for the entire second lens group 12, which is the rear group, to be capable of being displaced eccentrically, so that it is employed as an anti-vibration lens group. In this case, the amount of eccentric displacement of the second lens group 12 that is required for anti-vibration operation depends upon the magnification imparted to the second lens group. Reducing the amount of eccentric displacement during image shake correction by making the magnification imparted to the second lens group 12 high is effective for making the mechanism for displacing the second lens group 12 more compact and for suppressing the occurrence of eccentric coma aberration during eccentric displacement. However, excessive increase of the magnification imparted to the second lens group 12 causes the aberration generated in the first lens group 11 to be magnified, and this invites decrease of the overall image quality.

Thus, in the objective optical system 10 of this embodiment, the second lens group 12, which is the rear lens group, is built up from the positive lens group and the negative lens group that are mutually positioned closely together, and only this negative lens group 122 is made as an anti-vibration lens group and is adapted to be capable of being displaced eccentrically. Due to this, it becomes possible to impart high magnification to the negative lens group 122 (i.e. to the anti-vibration lens group) without deterioration of the image quality of the observed image.

Moreover, in this embodiment, it is desirable for the following conditions (1), (2), and (3) to be satisfied, where f is the combined focal length of the objective optical system 10, $f_1$ is the focal length of the first lens group 11, $f_2$ is the focal length of the second lens group 12, and D is the gap between the principal points of the first lens group 11 and the second lens group 12:

$$0.4 \leq f_1/f \leq 0.9 \quad (1)$$

$$0.5 \leq |f_2/f| \leq 1.4 \quad (2)$$

$$0.2 \leq D/f \leq 0.5 \quad (3)$$

The condition (1) defines the ratio between the combined focal length f of the objective optical system 10 and the focal length $f_1$ of the first lens group 11.

If the value of $f_1/f$ is made to be small, then it is possible to reduce the amount of eccentric displacement of the negative lens group 122 included in the second lens group 12 when correcting image shake, since the magnification imparted to the second lens group 12 becomes large. Moreover, since with an appropriate design it is possible to make the diameters of the lenses of the second lens group 12 small, accordingly it is possible to make the eccentric displacement mechanism for the negative lens group 122 more compact. Therefore it is possible to reduce the size of the casing of the observation optical system, and this is beneficial in practice. However, when the value of $f_1/f$ is lower than the lower limit value in the condition (1), then an excessively great magnification comes to be imparted to the second lens group 12, so that the aberration generated by the first lens group 11 is magnified. Accordingly aberration correction of the entire observation optical system 1 as a whole becomes difficult, which is undesirable.

On the other hand, if the value of $f_1/f$ is made to be large, then overall aberration correction becomes simple and easy, since the F value of the first lens group 11 becomes large. Moreover, in this case, for example, the number of lenses in the first lens group 11 can be reduced and it is not necessary to use a high priced glass material, accordingly it becomes possible to employ a simple structure for this lens group, and this is beneficial from the point of view of cost. However, when the value of $f_1/f$ is greater than the higher limit value in the condition (1), then the magnification imparted to the negative lens group 122 included in the second lens group 12 becomes low, so that, when correcting image shake, it is necessary to make the amount of eccentric displacement of this negative lens group 122 large. Furthermore, due to the refracting power of the first lens group 11 becoming small, the diameters of the lenses of the second lens group 12 become great. Since both of these effects invite increase in size of the eccentric displacement mechanism for the negative lens group 122, accordingly this situation is not desirable in practice.

The condition (2) defines the ratio between the combined focal length f of the objective optical system 10 and the focal length $f_2$ of the second lens group 12.

If the value of $|f_2/f|$ is made to be small, then, since the gap between the first lens group 11 and the second lens group 12 in order to obtain a predetermined focal length with the objective optical system 10 as a whole becomes wider, accordingly it is possible to reduce the diameters of the lenses in the second lens group 12, and it is possible to make the eccentric displacement mechanism of the negative lens group 122 more compact. However, if $|f_2/f|$ is lower than the lower limit value in the condition (2), then the space for disposing the erecting prism 20 becomes insufficient, since the back focus becomes too short. Moreover, the focal length of the negative lens group 122 can easily become short, so that the amount of eccentric aberration generated during image shake correction becomes large.

If the value of $|f_2/f|$ is made to be large, then the focal length of the negative lens group 122 becomes long, and it is possible to keep the amount of eccentric aberration generated during image shake correction low. However, if $|f_2/f|$ is greater than the upper limit value in the condition (2), then the diameters of the lenses of the second lens group 12 become great since the gap between the first lens group 11 and the second lens group 12 in order to obtain a predetermined focal length with the objective optical system 10 as a whole becomes narrower, and also the size of the eccentric displacement mechanism for the negative lens group 122 is increased so that the observation optical system 1 and its casing are increased in size, which is not desirable in practice.

The condition (3) defines the ratio between the gap D between the principal points of the first lens group 11 and the second lens group 12 and the combined focal length f of the objective optical system 10.

If the value of D/f is made to be small, then it is possible to make the amount of eccentric displacement of the negative lens group 122 included in the second lens group 12 during correction of image shake small, since the magnification imparted to the second lens group 12 becomes high. Moreover, with an appropriate design, it is possible to make the eccentric displacement mechanism of the negative lens group 122 more compact, since the diameters of the lenses of the second lens group 12 can be made small. However, if the value of D/f is lower than the lower limit value in the condition (3), then an excessively great magnification is imparted to the second lens group 12, so that the aberration generated by the first lens group 11 is magnified. This is not desirable, because it becomes difficult to perform overall aberration correction for the observation optical system 1 as a whole.

And if the value of D/f is made to be large, then this acts advantageously upon overall aberration correction, since the focal length of the first lens group 11 or the second lens group 12 becomes long. On the other hand, if the value of D/f exceeds the upper limit value in the condition (3), then, since the magnification imparted to the negative lens group 122 included in the second lens group 12 becomes low, accordingly it is necessary to make the amount of eccentric displacement of the negative lens group 122 during correction of image shake large. Moreover the space for disposing the erecting prism 20 becomes insufficient, since the back focus becomes too short.

Furthermore, in this embodiment, it is desirable for the following conditions (4) and (5) to be satisfied, where $f_2$ is the focal length of the second lens group 12, $f_{22}$ is the focal length of the negative lens group 122, and $D_2$ is the gap between the principal points of the positive lens group 121 and the negative lens group 122:

$$0.2 \leq f_{22}/f_2 \leq 0.6 \quad (4)$$

$$0.01 \leq |D_2/f_2| \leq 0.09 \quad (5)$$

The condition (4) defines the ratio between the focal length $f_2$ of the second lens group 12 and the focal length $f_{22}$ of the negative lens group 122 included in the second lens group 12.

If the value of $f_{22}/f_2$ is low, then, since the magnification imparted to the negative lens group 122 becomes high, accordingly the amount of eccentric displacement in order to obtain a predetermined anti-vibration effect becomes small, and this is connected with making the eccentric displacement mechanism more compact. However, if the value of $f_{22}/f_2$ is less than the lower limit value in the condition (4), then the curvatures of the negative lens group 122 become great, and correction of aberration, in particular correction of astigmatic aberration and of eccentric coma aberration, becomes difficult.

And, if the value of $f_{22}/f_2$ is high, then the curvatures of the lenses of the negative lens group 122 become small due to the fact that its focal length $f_{22}$ becomes long, so that overall aberration correction becomes simple and easy. The downside is that, since the magnification imparted to the negative lens group 122 becomes low, accordingly the amount of eccentric displacement in order to obtain a predetermined anti-vibration effect becomes large, and this is linked to increase in the size of the eccentric displacement mechanism. Moreover, due to the amount of eccentric displacement during anti-vibration operation increasing, an excessively great amount of eccentric aberration is generated, so that the image quality deteriorates. Thus, in order for a satisfactory image quality to be obtained with a practicable level of compactness even during anti-vibration operation, it is desirable for the value of $f_{22}/f_2$ not to exceed the upper limit value in the condition (4).

The condition (5) prescribes the gap $D_2$ between the principal points of the positive lens group 121 and the negative lens group 122 included in the second lens group 12 by taking the focal length $f_2$ of the second lens group 12 as a reference.

If the value of $|D_2/f_2|$ is made to be small, in other words if the gap $D_2$ between the principal points of the positive lens group 121 and the negative lens group 122 is made to be narrow, then, since the amounts of difference between the height at which a light beam passes through the positive lens group 121 and the height at which it passes through the negative lens group 122 become small, accordingly it becomes easy for the aberration generated by the positive lens group 121 to be corrected by the negative lens group 122, and this is connected with enhancement of the image quality. On the other hand, the first lens group 11 and the second lens group 12 come to be more separated due to change of the positions of their principal points, so that, as a whole, the magnification imparted to the negative lens group 122 becomes smaller. Due to this, the amount of eccentric displacement in order to obtain a predetermined level of anti-vibration operation becomes great, so that the size of the eccentric displacement mechanism is increased. Accordingly, in order to obtain satisfactory image quality without increasing the size of the eccentric displacement mechanism, it is desirable for the value of $|D_2/f_2|$ not to be lower than the lower limit value in the condition (5). Moreover, it is also necessary for $|D_2/f_2|$ not to be below the lower limit value in the condition (5), in order to ensure that sufficient space is available for installing the eccentric displacement mechanism.

Conversely, if the value of $|D_2/f_2|$ is made to be great, in other words if the gap D2 between the principal points of the positive lens group 121 and the negative lens group 122 is made to be wide, then, since the focal length of the second lens group 12 becomes long, in order to obtain a predetermined focal length for the second lens group 12, it is necessary either to lengthen the focal length of the positive lens group 121 or to shorten the focal length of the negative lens group 122. In either case, due to change of the principal point positions, the first lens group 11 and the second lens group 12 become closer together, so that the overall magnification imparted to the negative lens group 122 becomes greater. Due to this, the amount of eccentric displacement in order to obtain a predetermined level of anti-vibration operation becomes smaller, and this is connected with making the eccentric displacement mechanism more compact. However, if the value of $|D_2/f_2|$ is greater than the upper limit in the condition (5), then, since an excessively great magnification is imparted to the second lens group 12, accordingly the aberration generated by the first lens group 11 comes to be magnified. Furthermore, since the height at which a light beam passes through the negative lens group 122 becomes small with respect to the height at which it passes through the positive lens group 121, accordingly it becomes difficult for the spherical aberration and the coma aberration generated by the positive lens group 121 to be corrected by the negative lens group 122. Due to this, the overall image quality comes to be reduced.

Moreover, in this embodiment, it is desirable for the following condition (6) to be satisfied, where $r_1$ is the object side radius of curvature of the negative lens group 122 of the second lens group 12, and $r_2$ is its eye point side radius of curvature:

$$-1.2 \leq (r_2+r_1)/(r_2-r_1) \leq -0.8 \quad (6)$$

Since the negative lens group 122 causes the image to be displaced due to its eccentrically displacement during anti-vibration operation, accordingly accompanying asymmetrical aberration (eccentric coma aberration and astigmatic aberration) comes to be generated. Since the amount of eccentric aberration that is generated greatly depends upon the refracting power and the shapes of the negative lens group 122, accordingly an optimum design in relation to these shapes is required in order to suppress deterioration of the image during anti-vibration operation to the minimum limit. The condition (6) is one that specifies optimum shape for the negative lens group 122.

If the value of $(r_2+r_1)/(r_2-r_1)$ is made to be large (i.e. if its absolute value is made to be small), then correction of coma aberration of the overall observation optical system 1 becomes simple and easy. Moreover, it is possible to keep the generation of astigmatic aberration via eccentricity low during anti-vibration operation. However, if the value of $(r_2+r_1)/(r_2-r_1)$ is greater than the upper limit value in the condition (6), then the generation of coma aberration due to eccentricity becomes excessively great, and the image quality during anti-vibration operation comes to be deteriorated.

Moreover, if the value of $(r_2+r_1)/(r_2-r_1)$ is made to be small (i.e. its absolute value is made to be large), then the generation of coma aberration due to eccentricity during anti-vibration operation is suppressed. However, if the value of $(r_2+r_1)/(r_2-r_1)$ is less than the lower limit value in the condition (6), then the generation of astigmatic aberration due to eccentricity becomes excessive, and the image quality during anti-vibration operation comes to be deteriorated.

In this manner, in relation to the shapes of the negative lens group 122, there is a tradeoff relationship between aberration correction of the observation optical system 1 when eccentric aberration is present and when no eccentricity is present, and it is possible to preserve satisfactory image quality even during anti-vibration operation by the condition (6) being satisfied.

Furthermore, in this embodiment, if the negative lens group 122 of the second lens group 12 consists of a single negative lens, then it is desirable for the following condition (7) to be satisfied, where $\upsilon_{22}$ is the Abbe number of that single negative lens:

$$\upsilon_{22} \geq 50 \quad (7)$$

Since, according to this embodiment, it is possible to reduce the amount of eccentric displacement of the negative lens group 122 during anti-vibration operation, accordingly the generation of chromatic aberration of magnification due to eccentricity can be kept small even when the negative lens group 122 consists of a single lens. In addition to the above, due to the condition (7) being satisfied, it becomes possible to keep the occurrence of chromatic aberration of magnification due to eccentricity to the minimum limit.

It should be understood that it would also be acceptable to arrange to construct the negative lens group 122 as an achromatic negative cemented lens by adhering together a positive lens and a negative lens. Since, in this case, it is possible to make the effective Abbe number of the negative lens group 122 larger, accordingly it is possible to reduce yet further the generation of chromatic difference of magnification due to eccentricity.

EXAMPLES

Next, first through fifth examples according to this embodiment will be explained. It should be understood that, in the following Tables 1 through 5 that give the values of the specifications for the first through the fifth examples, No is the number of each lens surface from the object side, R is the radius of curvature of each lens surface, d is the distance along the optical axis from this lens surface to the next lens surface (or image surface), nd is the refractive index of each lens with respect to the line d, and vd is the Abbe number of each lens taking the d-line as a reference.

First Example

FIG. 1 is a figure for explanation of the structure of an observation optical system 1 according to a first example. The structure of this observation optical system 1 according to the first example is as described above. The values of the specifications for this first example are shown in the following Table 1.

TABLE 1

<Overall Specifications> f = 110.0
$f_1$ = 60.5

TABLE 1-continued $f_2 = -70.0$
F value = 5.2
$2\omega$ (angle of view) = 6.4
amount of image shake correction: 0.5° (amount of eccentric displacement of negative lens group 122: 0.491 mm)

<Lens Data>

| | R | D | nd | vd |
|---|---|---|---|---|
| 1 | 38.405 | 4.5 | 1.51680 | 64.12 |
| 2 | −51.104 | 1.5 | 1.71736 | 29.52 |
| 3 | ∞ | 0.5 | | |
| 4 | 56.199 | 3.0 | 1.51680 | 64.12 |
| 5 | 252.110 | 13.2 | | |
| 6 | 37.342 | 2.2 | 1.62004 | 36.24 |
| 7 | 352.381 | 2.7 | | |
| 8 | −527.009 | 1.0 | 1.56384 | 60.69 |
| 9 | 18.595 | 14.6 | | |
| 10 | ∞ | 20.0 | 1.51680 | 64.12 |
| 11 | ∞ | 0.4 | | |
| 12 | ∞ | 33.9 | 1.51680 | 64.12 |
| 13 | ∞ | 11.8 | | |
| 14 | ∞ | 10.0 | | |
| 15 | −215.000 | 1.5 | 1.78472 | 25.68 |
| 16 | 18.000 | 6.5 | 1.62041 | 60.29 |
| 17 | −18.000 | 0.2 | | |
| 18 | 18.000 | 4.0 | 1.62041 | 60.29 |
| 19 | −140.808 | 17.3 | | |

Moreover, in this first example, the values related to the conditions (1) through (7) described above are as follows. With this first example, since as shown below the conditions (1) through (7) are satisfied, accordingly it is possible to obtain the beneficial effects described above.

Figure 2:
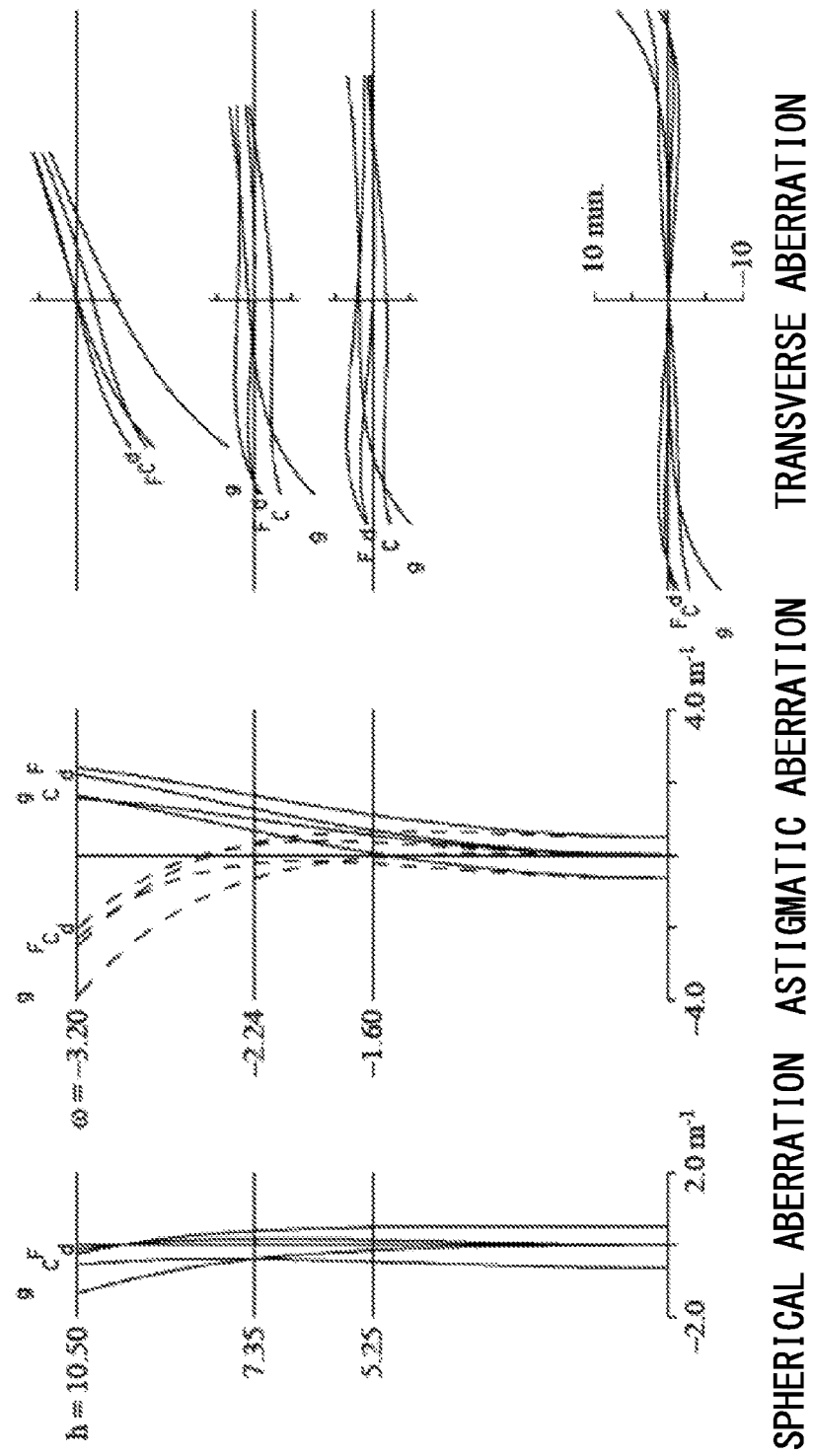
FIG. 2 is an aberration diagram of this observation optical system according to the first example.

$f_1/f=0.55$ $|f_2/f|=0.64$ $D/f=0.26$ $f_{22}/f_2=0.45$ $|D_2/f_2|=0.07$ $(r_2+r_1)/(r_2-r_1)=-0.93$ $\upsilon_{22}=60.69$ FIG. 2 is a figure showing the spherical aberration, the astigmatic aberration, and the transverse aberration of this observation optical system 1 according to the first example (which is an afocal system). From FIG. 2 it will be understood that, with this observation optical system 1 according to the first example, each of these aberrations is corrected satisfactorily.

Figure 3:
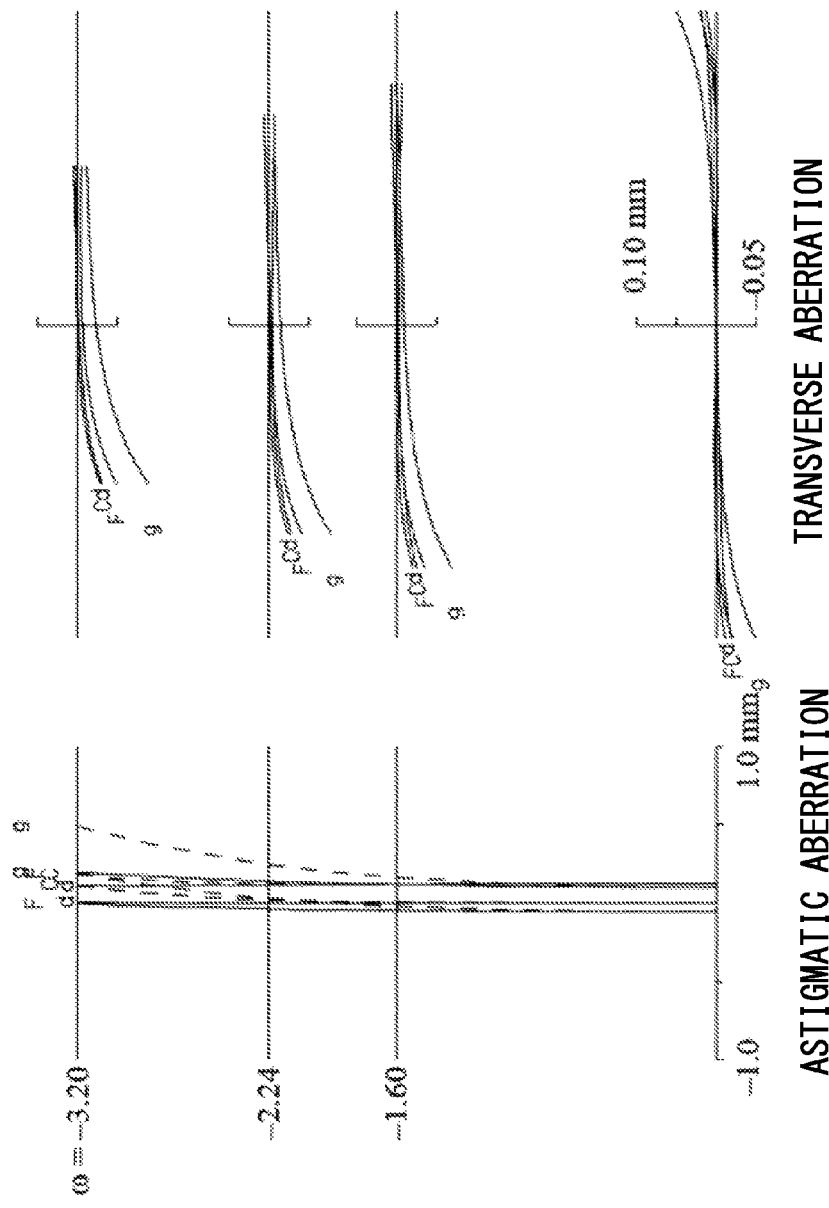
FIG. 3 is an aberration diagram of an objective optical system according to the first example when image shake correction is not being performed.
Figure 4:
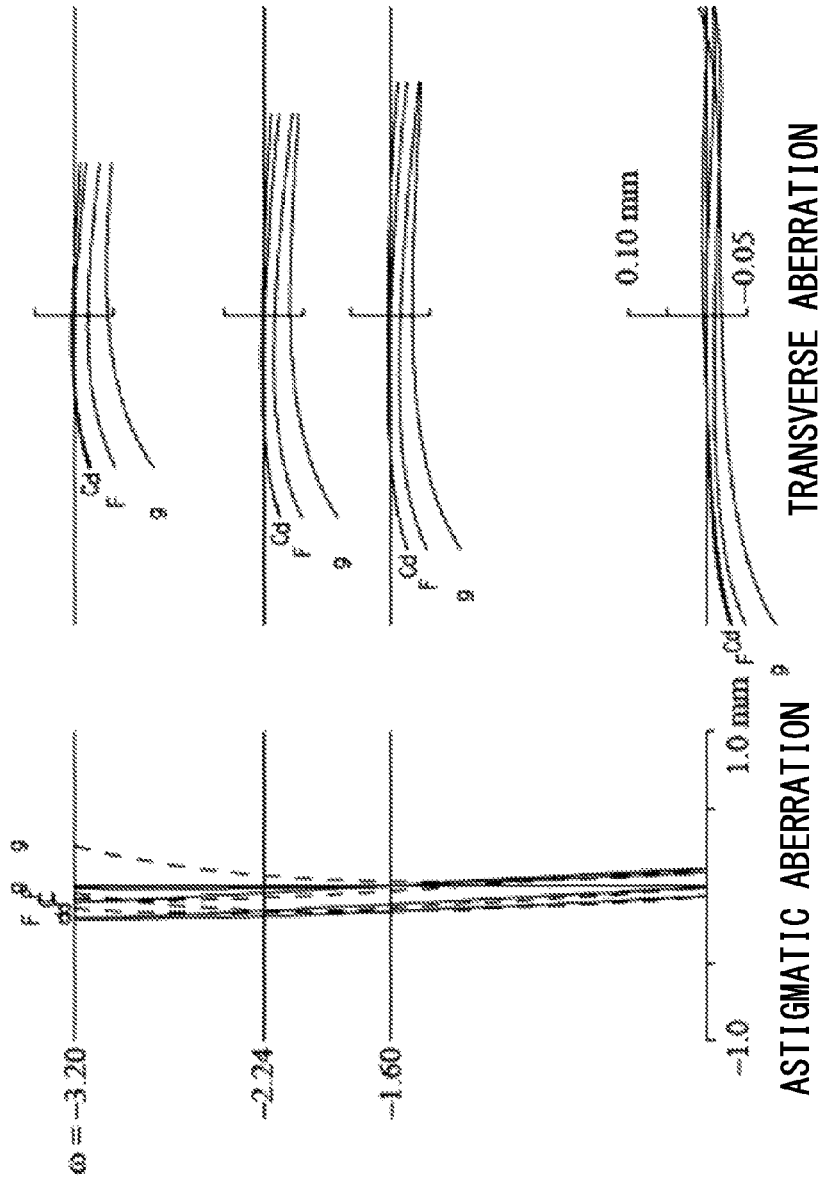
FIG. 4 is an aberration diagram of this objective optical system according to the first example when an image shake correction amount of 0.5° is being performed.
Figure 5:
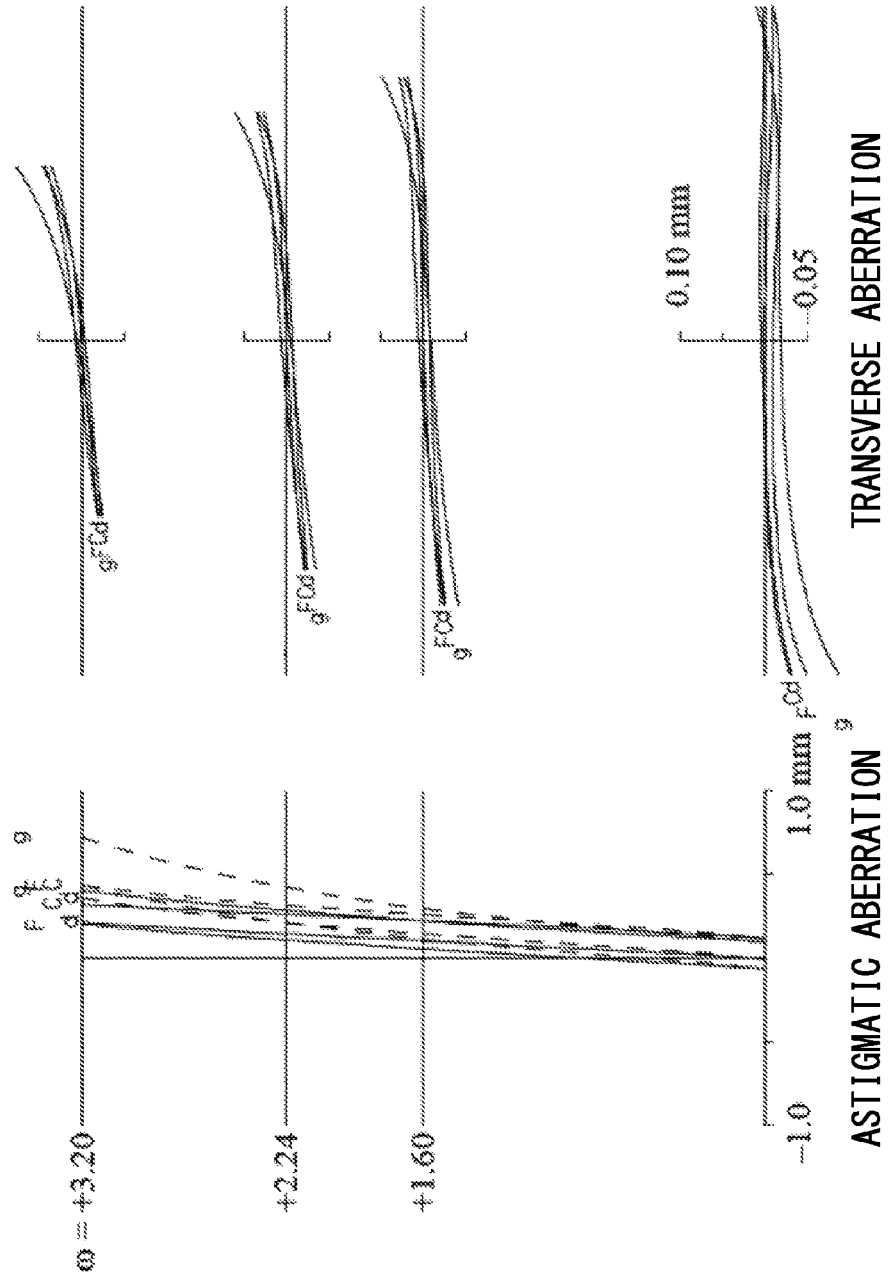
FIG. 5 is another aberration diagram of this objective optical system according to the first example when an image shake correction amount of 0.5° is being performed.

And FIGS. 3 through 5 are figures showing the astigmatic aberration and the transverse aberration of the objective optical system 10 according to the first example. FIG. 3 shows these aberrations when the negative lens group 122 is not being displaced eccentrically and image shake correction is not being performed, while FIGS. 4 and 5 show these aberrations when the negative lens group 122 is being displaced eccentrically and image shake correction whose amount is 0.5° is being performed. According to FIGS. 3 through 5 it will be understood that, both when image shake correction is not being performed and when it is being performed, both of these types of aberration of the objective optical system 10 are corrected satisfactorily, and that excellent image focusing performance is obtained. Thus it will be evident that, with the overall observation optical system 1 according to this first example, both of these types of aberration are corrected, both when image shake correction is not being performed and when it is being performed.

Second Example

Figure 6:
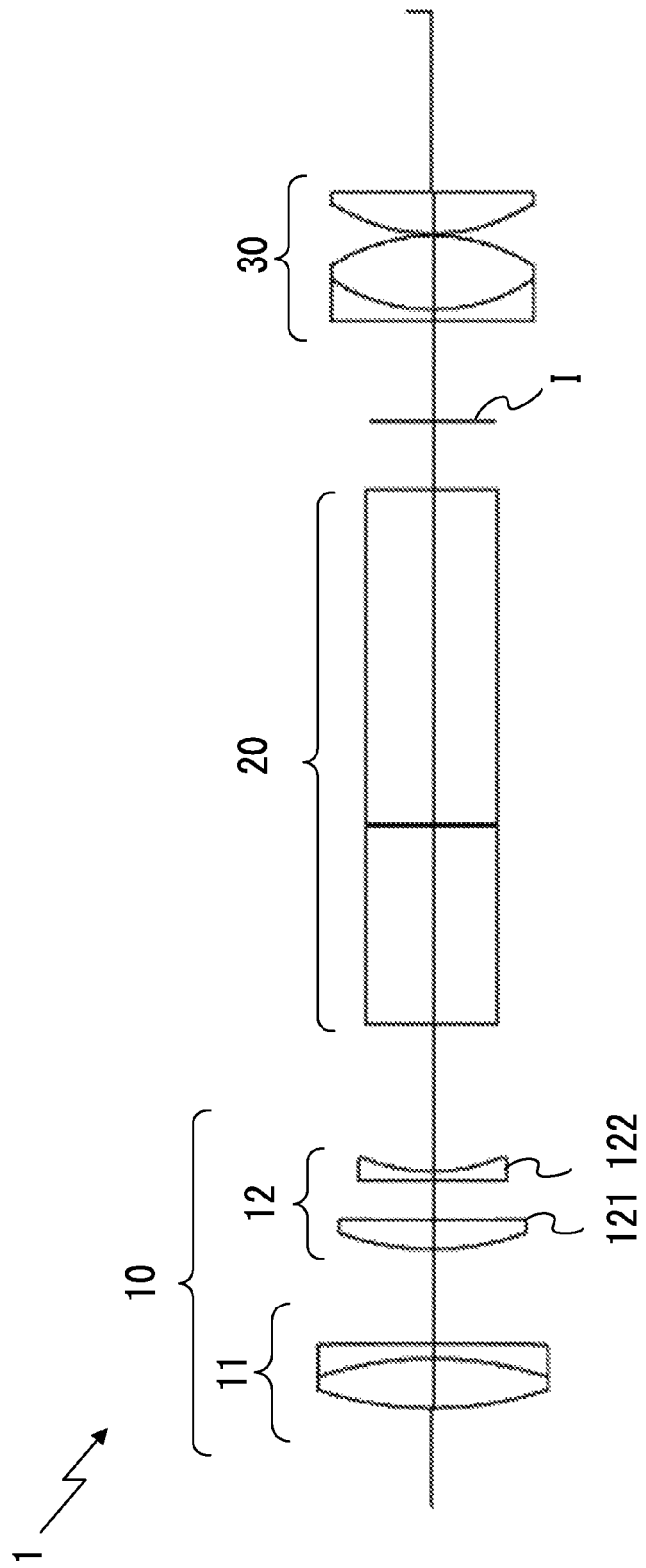
FIG. 6 is a figure for explanation of the structure of an observation optical system according to a second example.

FIG. 6 is a figure for explanation of the structure of an observation optical system 1 according to a second example. The structure of this observation optical system 1 according to the second example is also as described above. The values of the specifications for this second example are shown in the following Table 2.

TABLE 2

<Overall Specifications> f = 96.0
$f_1 = 70.5$
$f_2 = -115.3$
F value = 4.6
$2\omega$ (angle of view) = 7.5
amount of image shake correction: 0.6° (amount of eccentric displacement of negative lens group 122: 0.504 mm)

<Lens Data>

| | R | D | nd | vd |
|---|---|---|---|---|
| 1 | 36.500 | 5.0 | 1.58913 | 61.18 |
| 2 | −36.500 | 1.5 | 1.71736 | 29.52 |
| 3 | −490.000 | 9.6 | | |
| 4 | 26.200 | 3.0 | 1.58144 | 40.75 |
| 5 | 560.000 | 3.9 | | |
| 6 | ∞ | 1.0 | 1.58913 | 61.18 |
| 7 | 17.000 | 14.8 | | |
| 8 | ∞ | 20.0 | 1.51680 | 64.12 |
| 9 | ∞ | 0.4 | | |
| 10 | ∞ | 33.9 | 1.51680 | 64.12 |
| 11 | ∞ | 6.9 | | |
| 12 | ∞ | 10.0 | | |
| 13 | ∞ | 1.2 | 1.80518 | 25.43 |
| 14 | 17.810 | 7.6 | 1.62041 | 60.29 |
| 15 | −17.810 | 0.2 | | |
| 16 | 17.810 | 4.1 | 1.62041 | 60.29 |
| 17 | ∞ | 18.5 | | |

Moreover, in this second example, the values related to the conditions (1) through (7) described above are as follows. With this second example, since as shown below the conditions (1) through (7) are satisfied, accordingly it is possible to obtain the beneficial effects described above.

Figure 7:
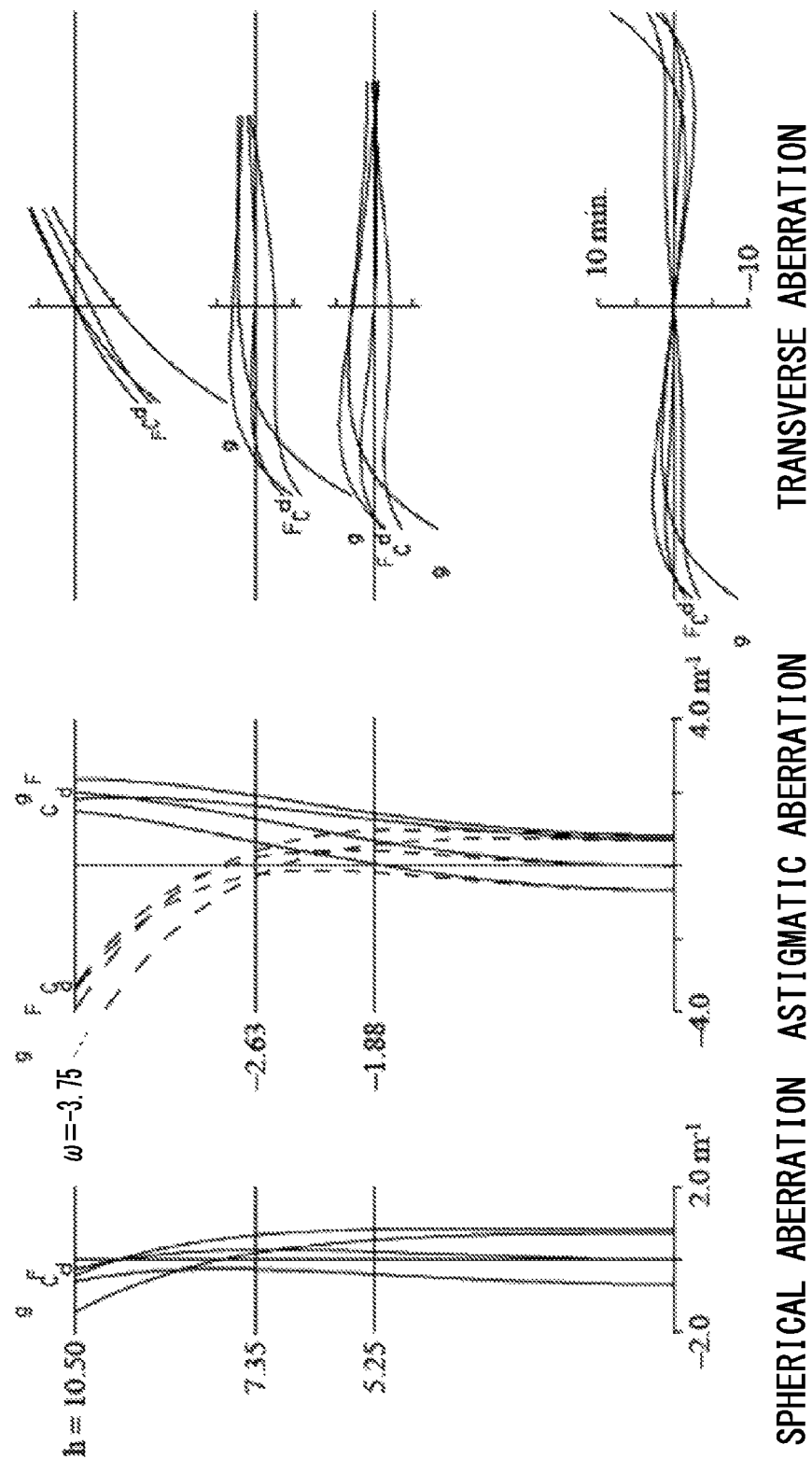
FIG. 7 is an aberration diagram of this observation optical system according to the second example.

$f_1/f=0.73$ $|f_2/f|=1.20$ $D/f=0.42$ $f_{22}/f_2=0.25$ $|D_2/f_2|=0.06$ $(r_2+r_1)/(r_2-r_1)=-1.0$ $\upsilon_{22}=61.18$ FIG. 7 is a figure showing the spherical aberration, the astigmatic aberration, and the transverse aberration of this observation optical system 1 according to the second example (which is an afocal system). From FIG. 7 it will be understood that, with this observation optical system 1 according to the second example, each of these aberrations is corrected satisfactorily.

Figure 8:
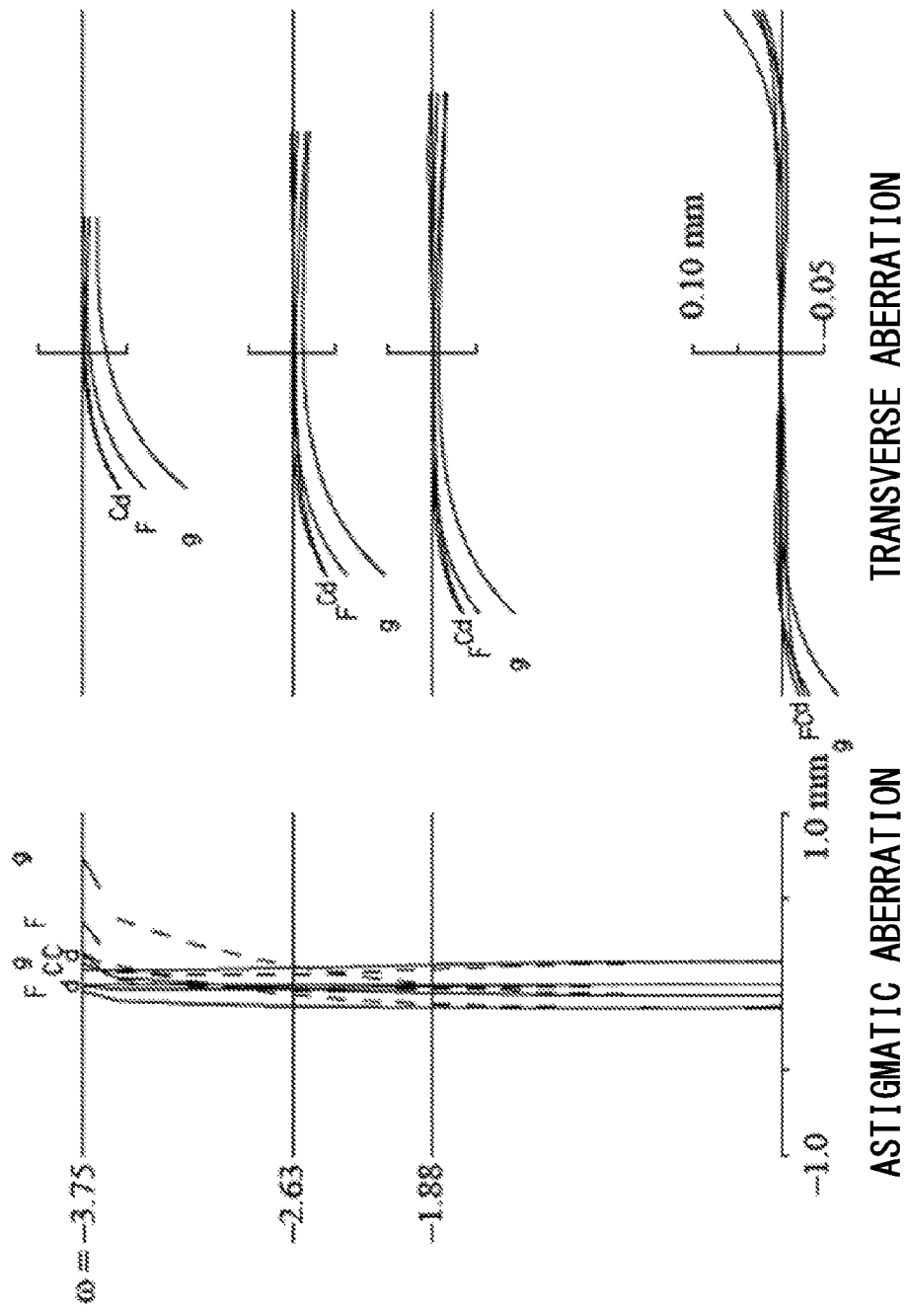
FIG. 8 is an aberration diagram of an objective optical system according to the second example when image shake correction is not being performed.
Figure 9:
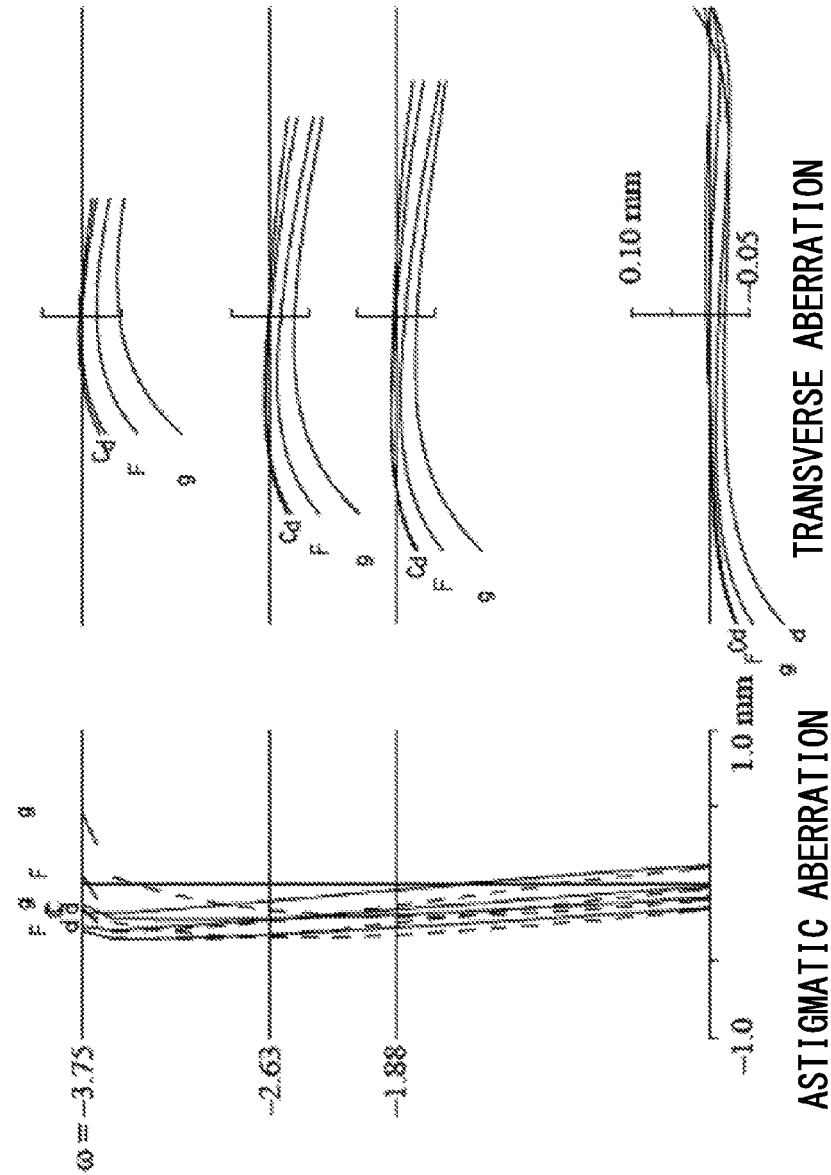
FIG. 9 is an aberration diagram of this objective optical system according to the second example when an image shake correction amount of 0.6° is implemented.
Figure 10:
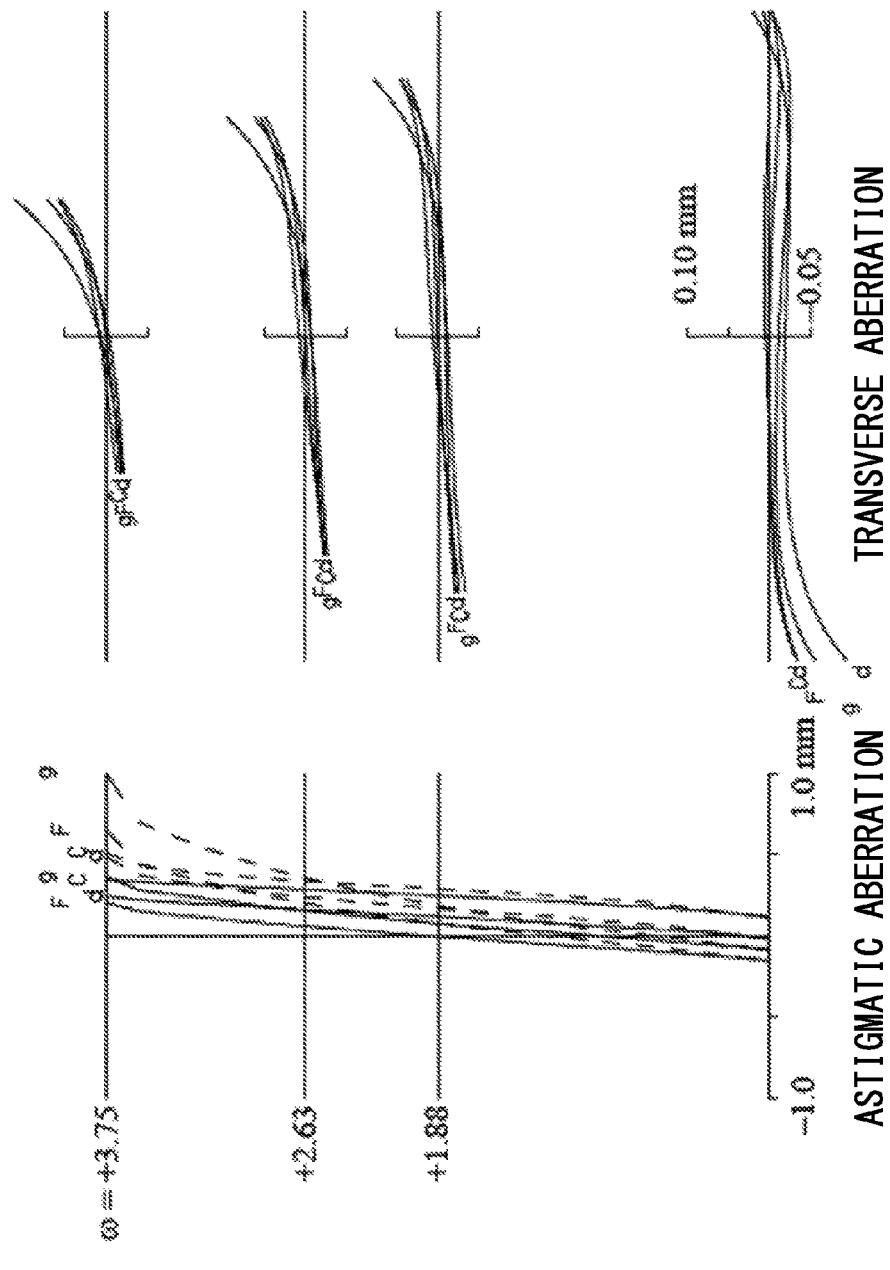
FIG. 10 is another aberration diagram of this objective optical system according to the second example when an image shake correction amount of 0.6° is being performed.

And FIGS. 8 through 10 are figures showing the astigmatic aberration and the transverse aberration of the objective optical system 10 according to the second example. FIG. 8 shows these aberrations when the negative lens group 122 is not being displaced eccentrically and image shake correction is not being performed, while FIGS. 9 and 10 show these aberrations when the negative lens group 122 is being displaced eccentrically and image shake correction whose amount is 0.6° is being performed. According to FIGS. 8 through 10 it will be understood that, both when image shake correction is not being performed and when it is being performed, both of these types of aberration of the objective optical system 10 are corrected satisfactorily, and that excellent image focusing performance is obtained. Thus it will be evident that, with the overall observation optical system 1 according to this second example, both of these types of aberration are corrected, both when image shake correction is not being performed and when it is being performed.

Third Example

Figure 11:
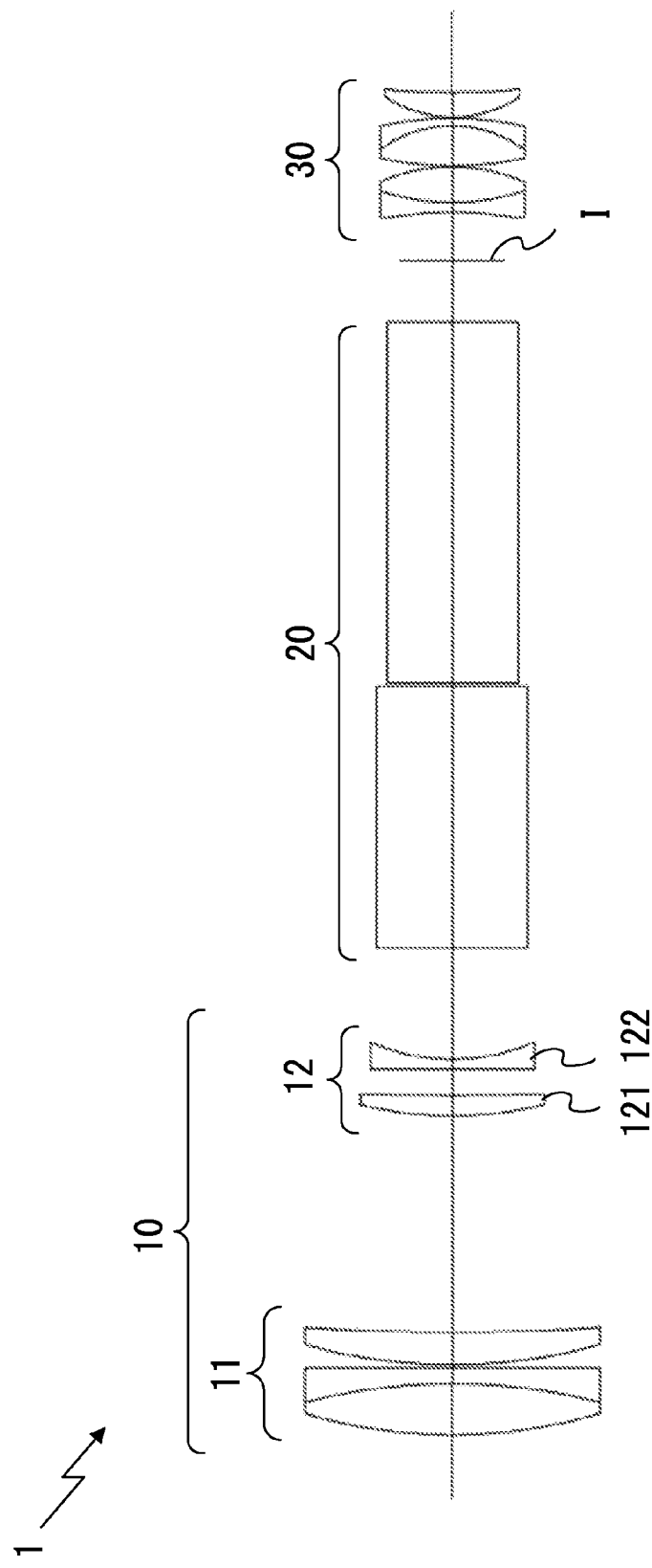
FIG. 11 is a figure for explanation of the structure of an observation optical system according to a third example.

FIG. 11 is a figure for explanation of the structure of an observation optical system 1 according to a third example. The structure of this observation optical system 1 according to the third example is also as described above. The values of the specifications for this third example are shown in the following Table 3.

TABLE 3

<Overall Specifications> f = 180.0
$f_1$ = 108.0
$f_2$ = −123.0
F value = 4.3
2ω (angle of view) = 5.0
amount of image shake correction: 0.5° (amount of eccentric displacement of negative lens group 122: 0.931 mm)

<Lens Data>

| | R | D | nd | vd |
|---|---|---|---|---|
| 1 | 76.694 | 8.0 | 1.51680 | 64.12 |
| 2 | −90.216 | 2.5 | 1.68893 | 31.06 |
| 3 | 5625.010 | 0.5 | | |
| 4 | 83.673 | 5.0 | 1.51680 | 64.12 |
| 5 | 334.890 | 33.7 | | |
| 6 | 57.435 | 3.2 | 1.58144 | 40.75 |
| 7 | 701.289 | 4.1 | | |
| 8 | ∞ | 1.5 | 1.58313 | 59.38 |
| 9 | 31.186 | 17.3 | | |
| 10 | ∞ | 40.7 | 1.56883 | 56.32 |
| 11 | ∞ | 0.5 | | |
| 12 | ∞ | 56.1 | 1.51680 | 64.12 |
| 13 | ∞ | 9.6 | | |
| 14 | ∞ | 7.5 | | |
| 15 | −51.800 | 1.5 | 1.80518 | 25.43 |
| 16 | 35.000 | 5.5 | 1.71300 | 53.89 |
| 17 | −28.000 | 0.2 | | |
| 18 | 50.000 | 6.2 | 1.71300 | 53.89 |
| 19 | −18.500 | 1.2 | 1.80518 | 25.43 |
| 20 | −50.000 | 0.2 | | |
| 21 | 18.500 | 3.8 | 1.71300 | 53.89 |
| 22 | 105.369 | 13.6 | | |

Moreover, in this third example, the values related to the conditions (1) through (7) described above are as follows. With this third example, since as shown below the conditions (1) through (7) are satisfied, accordingly it is possible to obtain the beneficial effects described above.

$f_1/f$=0.60

$|f_2/f|$=0.68

$D/f$=0.33

$f_{22}/f_2$=0.43

$|D_2/f_2|$=0.06

$(r_2+r_1)/(r_2-r_1)$=−1.0

$\nu_{22}$=59.38

FIG. 12 is a figure showing the spherical aberration, the astigmatic aberration, and the transverse aberration of this observation optical system 1 according to the third example (which is an afocal system). From FIG. 12 it will be understood that, with this observation optical system 1 according to the third example, each of these aberrations is corrected satisfactorily.

Figure 13:
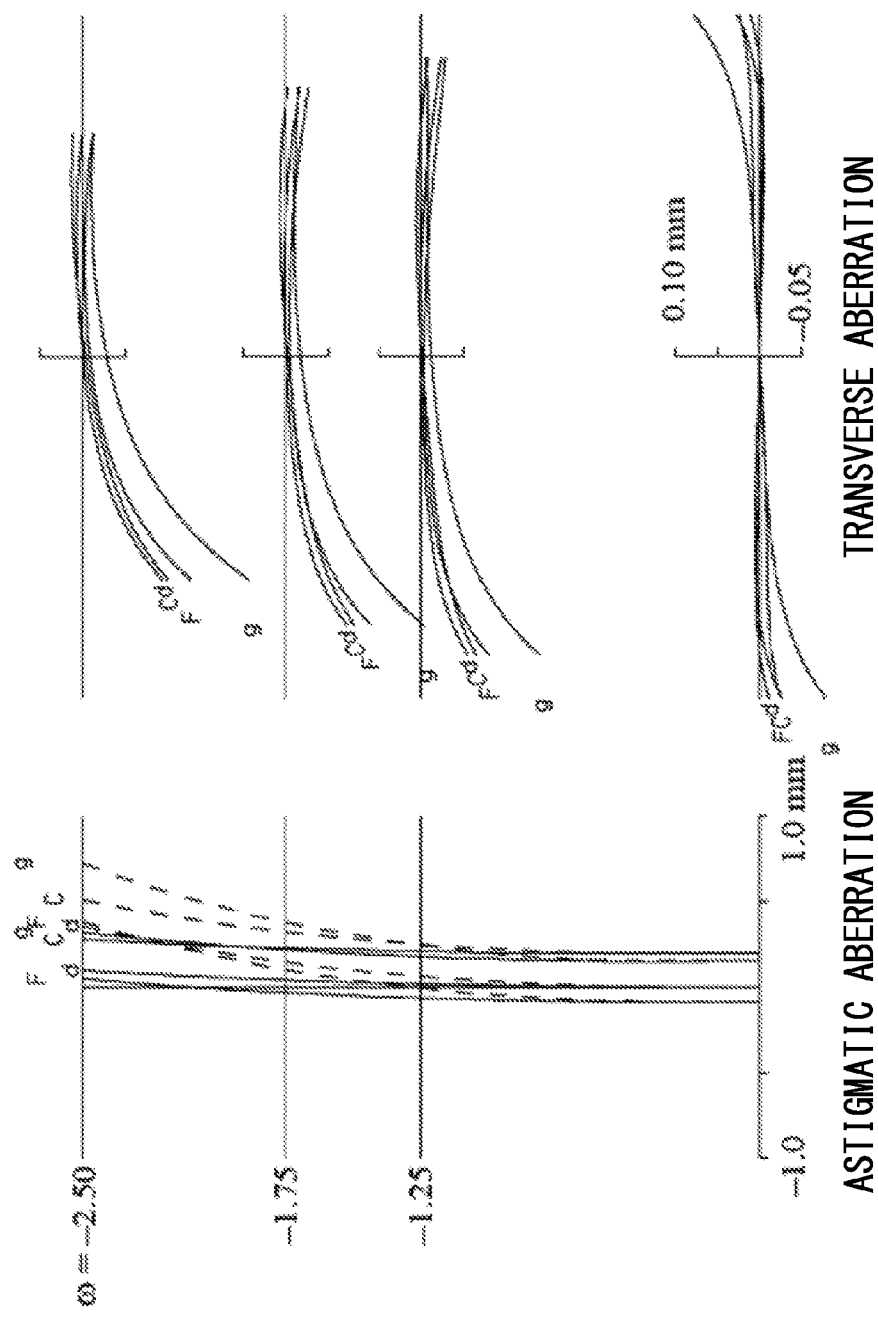
FIG. 13 is an aberration diagram of an objective optical system according to the third example when image shake correction is not being performed.
Figure 14:
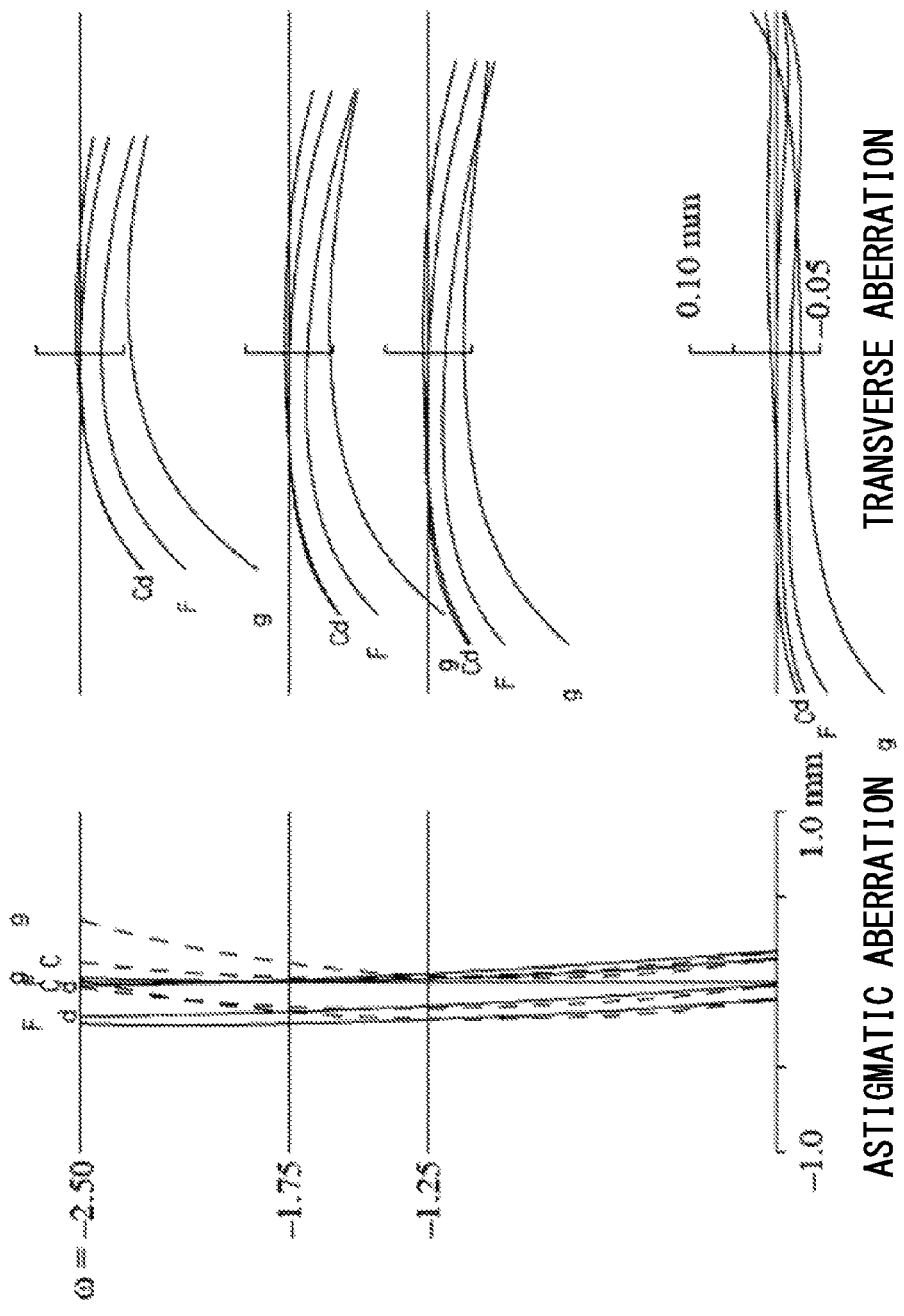
FIG. 14 is an aberration diagram of this objective optical system according to the third example when an image shake correction amount of 0.5° is being performed.
Figure 15:
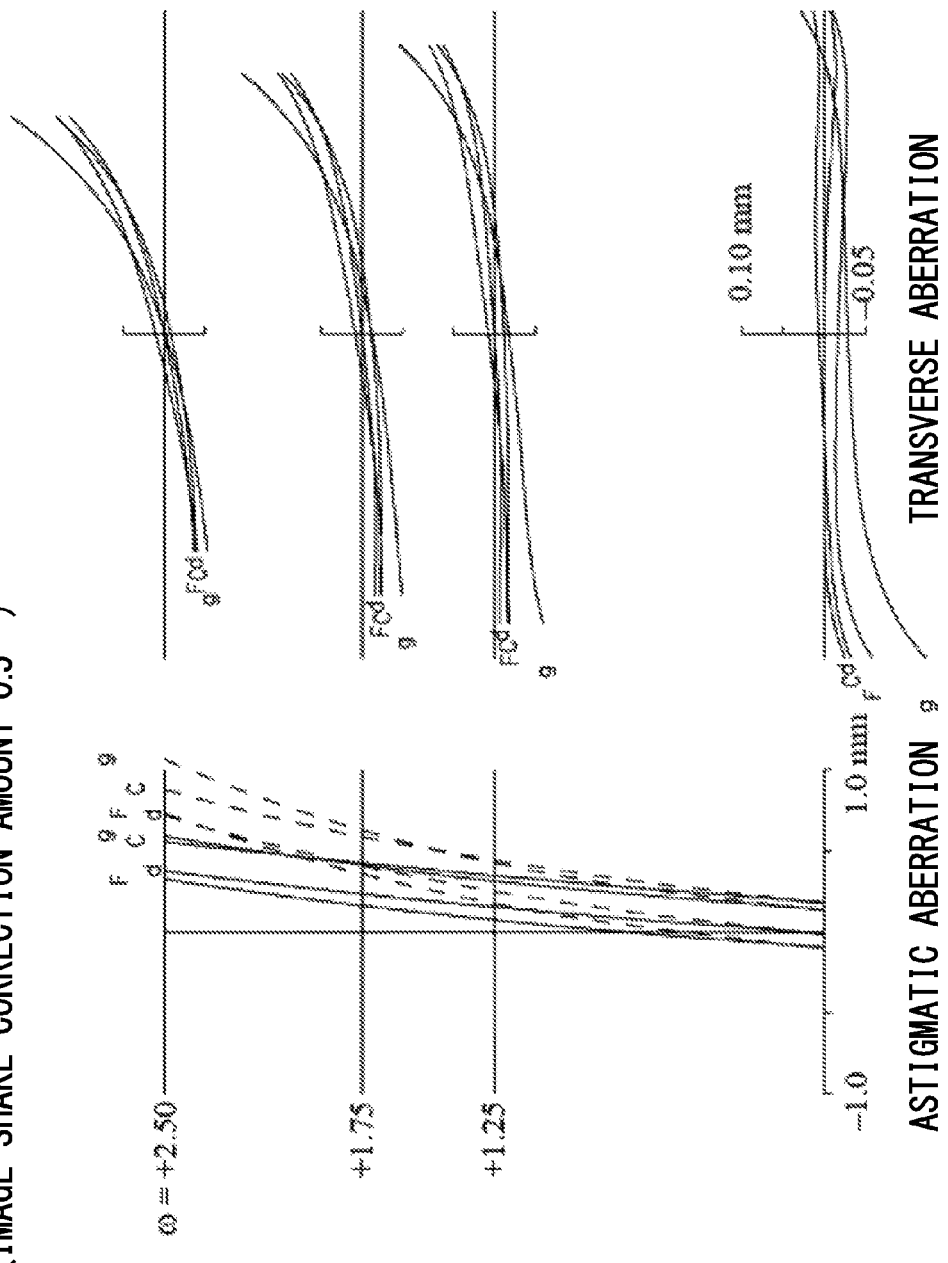
FIG. 15 is another aberration diagram of this objective optical system according to the third example when an image shake correction amount of 0.5° is being performed.

And FIGS. 13 through 15 are figures showing the astigmatic aberration and the transverse aberration of the objective optical system 10 according to the third example. FIG. 13 shows these aberrations when the negative lens group 122 is not being displaced eccentrically and image shake correction is not being performed, while FIGS. 14 and 15 show these aberrations when the negative lens group 122 is being displaced eccentrically and image shake correction whose amount is 0.5° is being performed. According to FIGS. 13 through 15 it will be understood that, both when image shake correction is not being performed and when it is being performed, both of these types of aberration of the objective optical system 10 are corrected satisfactorily, and that excellent image focusing performance is obtained. Thus it will be evident that, with the overall observation optical system 1 according to this third example, both of these types of aberration are corrected, both when image shake correction is not being performed and when it is being performed.

Fourth Example

Figure 16:
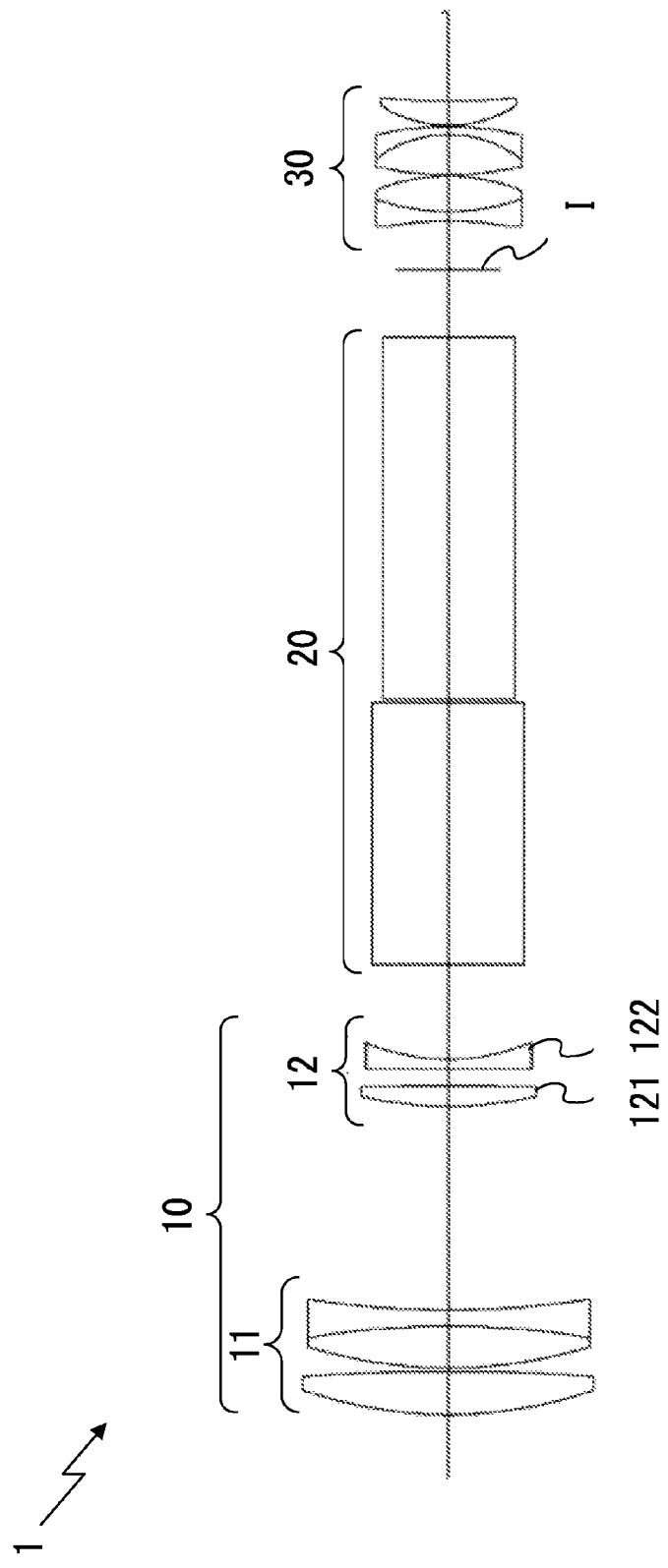
FIG. 16 is a figure for explanation of the structure of an observation optical system according to a fourth example.

FIG. 16 is a figure for explanation of the structure of an observation optical system 1 according to a fourth example. The structure of this observation optical system 1 according to the fourth example is also as described above. The values of the specifications for this fourth example are shown in the following Table 4. It should be understood that, in this observation optical system according to the fourth example, the focal lengths, the F values, and the angles of view of the objective optical system 10, of the first lens group 11, and of the second lens group 12 are the same as in the third example.

TABLE 4

<Overall Specifications> f = 180.0
$f_1$ = 108.0
$f_2$ = −123.0
F value = 4.3
2ω (angle of view) = 5.0
amount of image shake correction: 0.5° (amount of eccentric displacement of negative lens group 122: 0.931 mm)

<Lens Data>

| | R | D | nd | vd |
|---|---|---|---|---|
| 1 | 65.157 | 6.8 | 1.51680 | 64.12 |
| 2 | −283.382 | 0.5 | | |
| 3 | 71.496 | 6.5 | 1.49782 | 82.56 |

TABLE 4-continued

| | | | | |
|---|---|---|---|---|
| 4 | −124.173 | 2.5 | 1.79952 | 42.26 |
| 5 | 140.217 | 31.6 | | |
| 6 | 56.292 | 3.2 | 1.51742 | 52.32 |
| 7 | −760.199 | 2.6 | | |
| 8 | ∞ | 1.5 | 1.58913 | 61.18 |
| 9 | 30.965 | 14.7 | | |
| 10 | ∞ | 40.7 | 1.56883 | 56.32 |
| 11 | ∞ | 0.5 | | |
| 12 | ∞ | 56.1 | 1.51680 | 64.12 |
| 13 | ∞ | 10.6 | | |
| 14 | ∞ | 7.5 | | |
| 15 | −51.800 | 1.5 | 1.80518 | 25.43 |
| 16 | 33.000 | 5.5 | 1.71300 | 53.89 |
| 17 | −28.000 | 0.2 | | |
| 18 | 50.000 | 6.2 | 1.71300 | 53.89 |
| 19 | −18.000 | 1.2 | 1.80518 | 25.43 |
| 20 | −50.000 | 0.2 | | |
| 21 | 18.500 | 3.8 | 1.71300 | 53.89 |
| 22 | 109.893 | 13.8 | | |

Moreover, in this fourth example, the values related to the conditions (1) through (6) described above are as follows. With this fourth example, since as shown below the conditions (1) through (6) are satisfied, accordingly it is possible to obtain the beneficial effects described above.

$f_1/f=0.60$ $|f_2/f|=0.68$ $D/f=0.33$ $f_{22}/f_2=0.43$ $|D_2/f_2|=0.04$ $(r_2+r_1)/(r_2-r_1)=-1.0$ $v_{22}=61.18$

Figure 17:
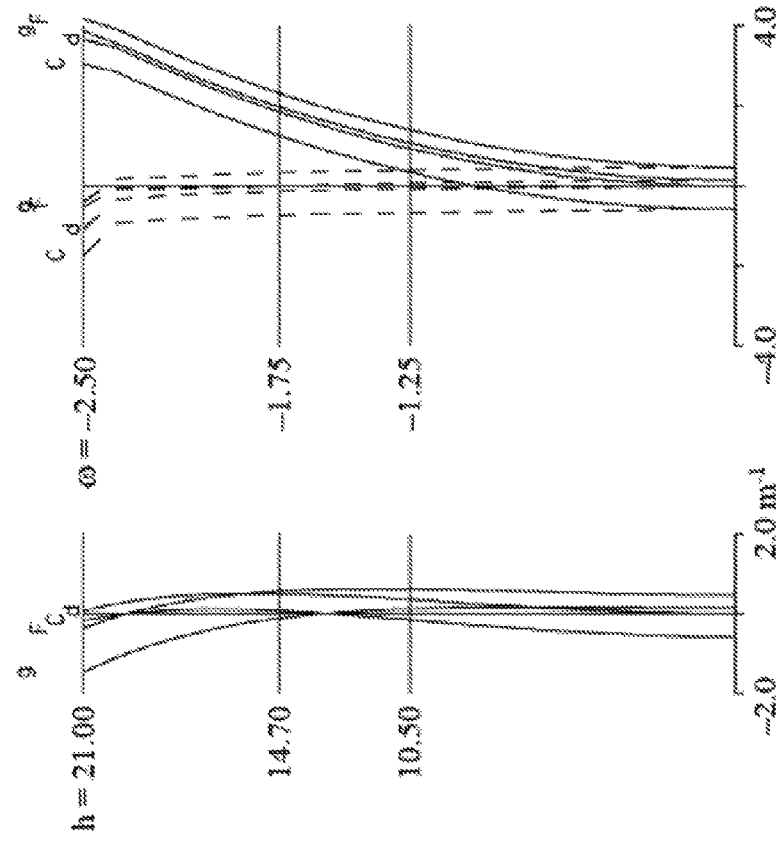
FIG. 17 is an aberration diagram of this observation optical system according to the fourth example.

FIG. 17 is a figure showing the spherical aberration, the astigmatic aberration, and the transverse aberration of this observation optical system 1 according to the fourth example (which is an afocal system). From FIG. 17 it will be understood that, with this observation optical system 1 according to the fourth example, each of these aberrations is corrected satisfactorily.

Figure 18:
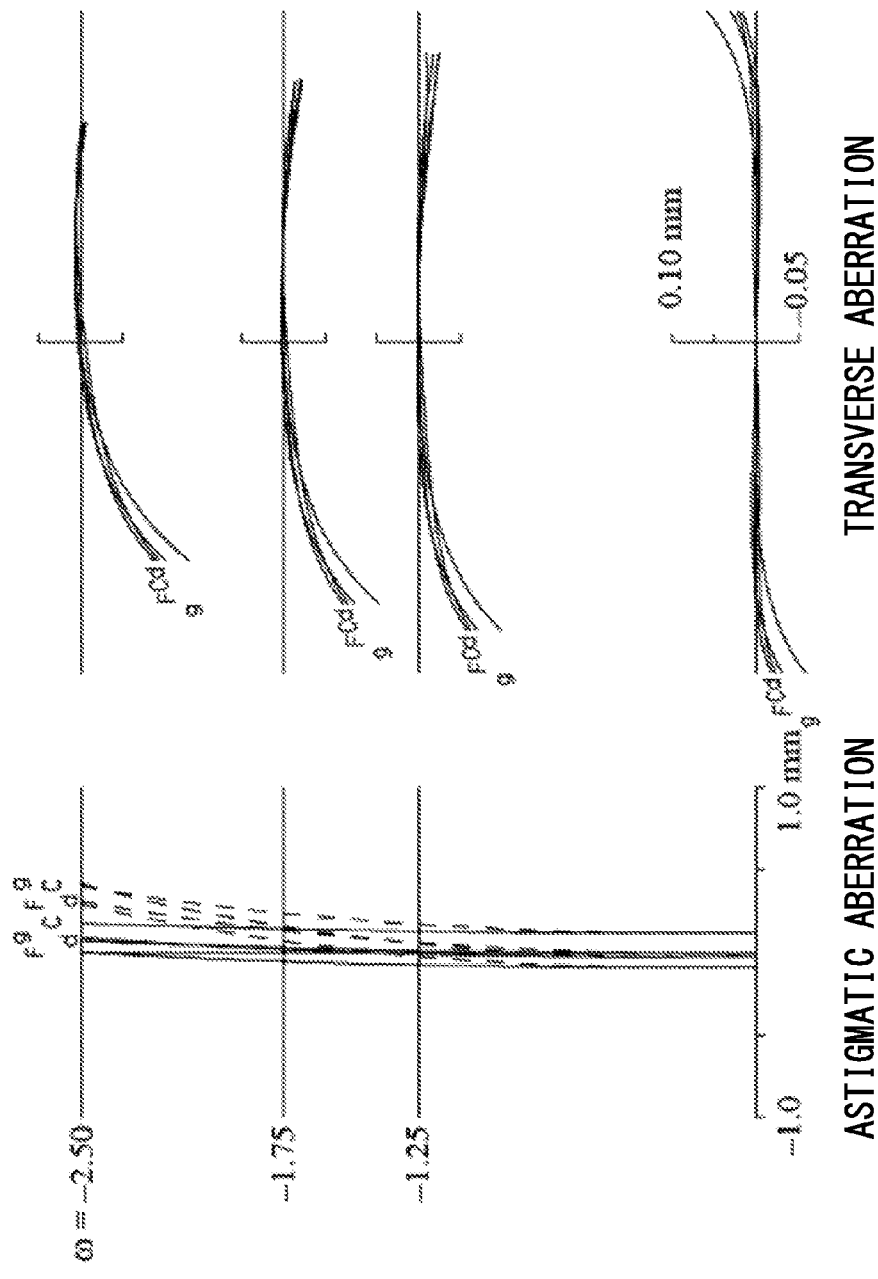
FIG. 18 is an aberration diagram of an objective optical system according to the fourth example when image shake correction is not being performed.
Figure 19:
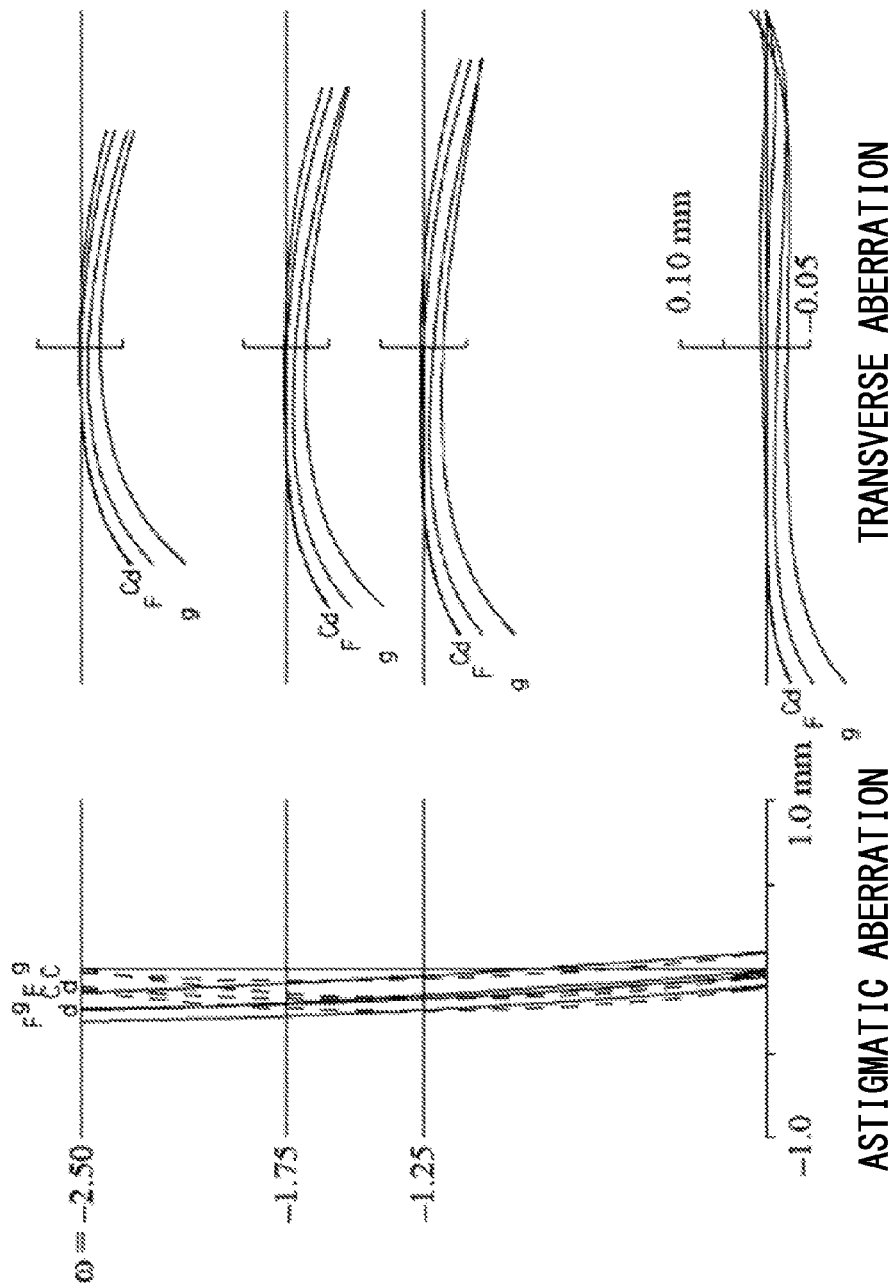
FIG. 19 is an aberration diagram of this objective optical system according to the fourth example when an image shake correction amount of 0.5° is being performed.
Figure 20:
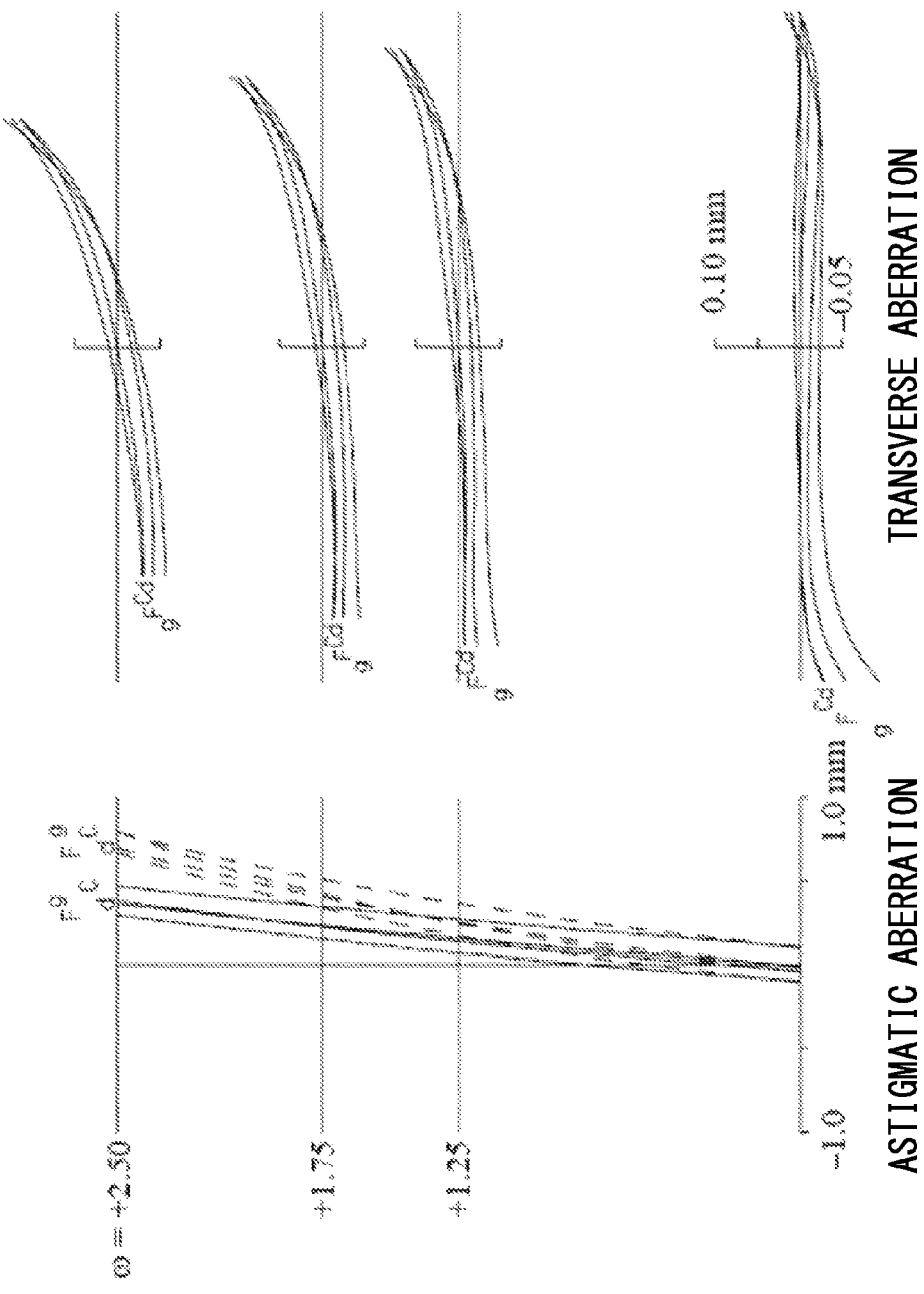
FIG. 20 is another aberration diagram of this objective optical system according to the fourth example when an image shake correction amount of 0.5° is being performed.

And FIGS. 18 through 20 are figures showing the astigmatic aberration and the transverse aberration of the objective optical system 10 according to the fourth example. FIG. 18 shows these aberrations when the negative lens group 122 is not being displaced eccentrically and image shake correction is not being performed, while FIGS. 19 and 20 show these aberrations when the negative lens group 122 is being displaced eccentrically and image shake correction whose amount is 0.5° is being performed. According to FIGS. 18 through 20 it will be understood that, both when image shake correction is not being performed and when it is being performed, both of these types of aberration of the objective optical system 10 are corrected satisfactorily, and that excellent image focusing performance is obtained. Thus it will be evident that, with the overall observation optical system 1 according to this fourth example, both of these types of aberration are corrected, both when image shake correction is not being performed and when it is being performed.

Fifth Example

Figure 21:
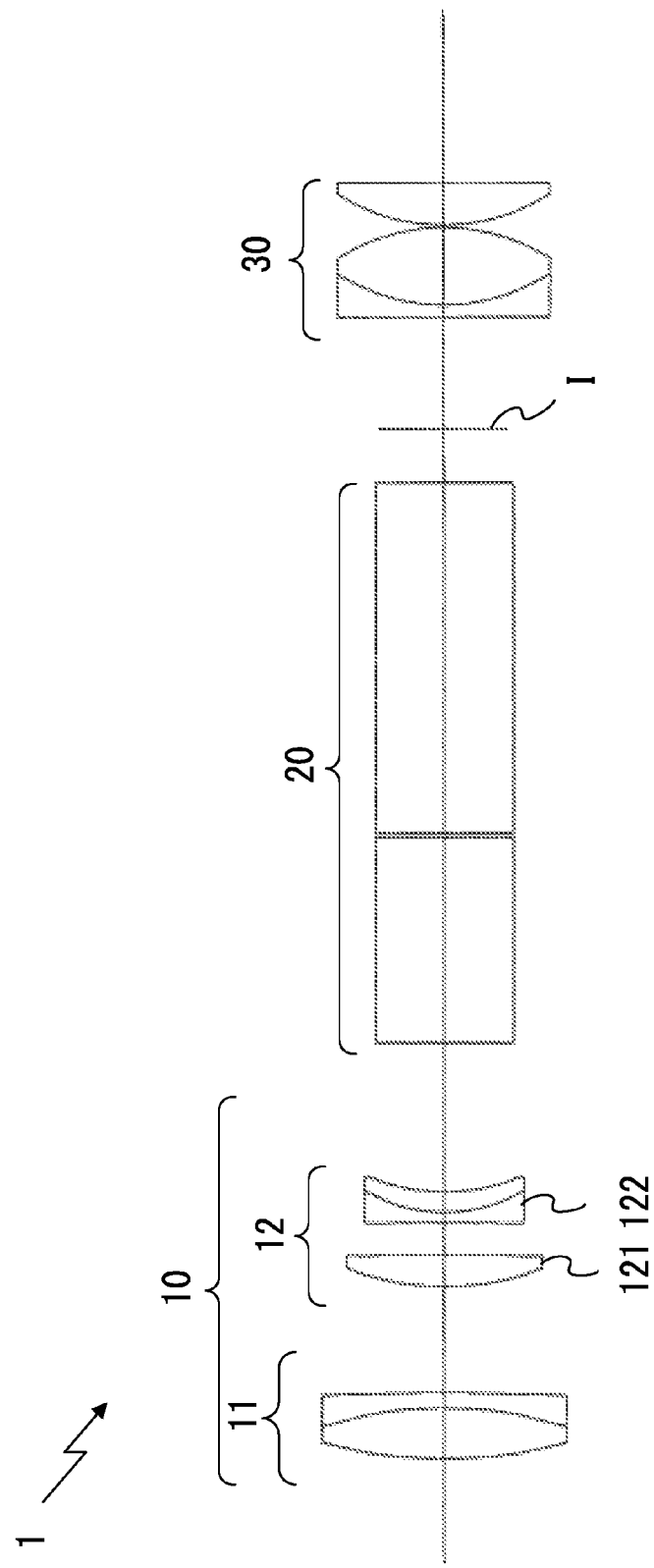
FIG. 21 is a figure for explanation of the structure of an observation optical system according to a fifth example.

FIG. 21 is a figure for explanation of the structure of an observation optical system 1 according to a fifth example.

The structure of this observation optical system 1 according to the fifth example is also as described above. It should be understood that, by contrast to the first through the fourth examples described above in which the negative lens group 122 consisted of a single negative lens, in this fifth example, the negative lens group 122 is made as a negative cemented lens in which two lenses are adhered together. The values of the specifications for this fifth example are shown in the following Table 5.

TABLE 5

<Overall Specifications> f = 96.0
$f_1$ = 71.8
$f_2$ = −115.7
F value = 4.6
2ω (angle of view) = 7.4
amount of image shake correction: 0.6° (amount of eccentric displacement of negative lens group 122: 0.503 mm)

<Lens Data>

| | R | D | nd | vd |
|---|---|---|---|---|
| 1 | 41.500 | 5.0 | 1.58913 | 61.18 |
| 2 | −36.500 | 1.5 | 1.71736 | 29.52 |
| 3 | −220.000 | 10.2 | | |
| 4 | 25.000 | 3.0 | 1.51680 | 64.12 |
| 5 | −550.000 | 3.2 | | |
| 6 | −400.000 | 1.0 | 1.65160 | 58.54 |
| 7 | 14.500 | 2.0 | 1.71736 | 29.52 |
| 8 | 18.616 | 14.4 | | |
| 9 | ∞ | 20.0 | 1.51680 | 64.12 |
| 10 | ∞ | 0.4 | | |
| 11 | ∞ | 33.9 | 1.51680 | 64.12 |
| 12 | ∞ | 6.0 | | |
| 13 | ∞ | 10.0 | | |
| 14 | ∞ | 1.2 | 1.80518 | 25.43 |
| 15 | 17.810 | 7.6 | 1.62041 | 60.29 |
| 16 | −17.810 | 0.2 | | |
| 17 | 17.810 | 4.1 | 1.62041 | 60.29 |
| 18 | ∞ | 19.0 | | |

Moreover, in this fifth example, the values related to the conditions (1) through (6) described above are as follows. With this fifth example, since as shown below the conditions (1) through (6) are satisfied, accordingly it is possible to obtain the beneficial effects described above.

$f_1/f=0.75$ $|f_2/f|=1.21$ $D/f=0.44$ $f_{22}/f_2=0.24$ $|D_2/f_2|=0.06$ $(r_2+r_1)/(r_2-r_1)=-0.91$

Figure 22:
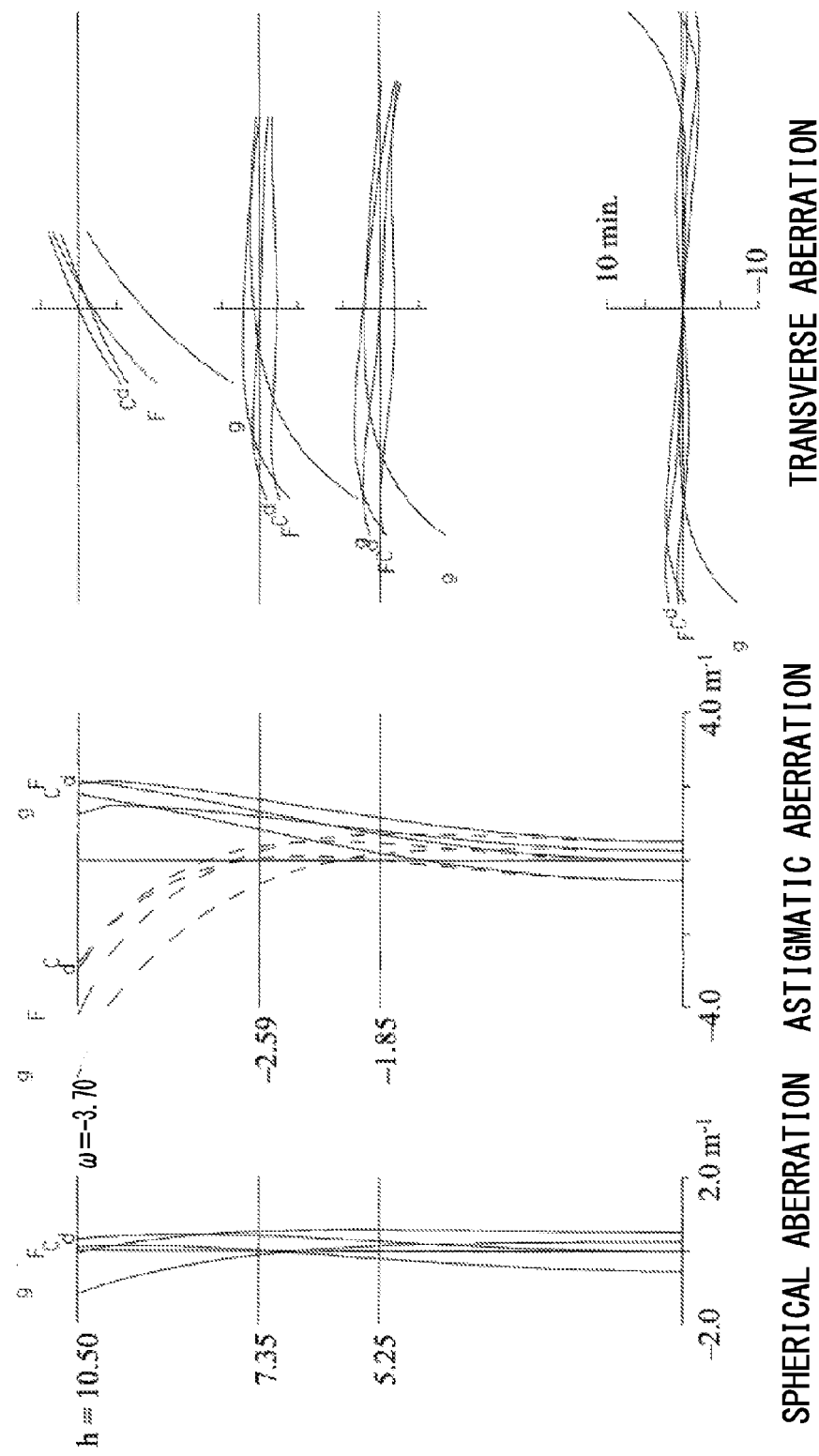
FIG. 22 is an aberration diagram of this observation optical system according to the fifth example.

FIG. 22 is a figure showing the spherical aberration, the astigmatic aberration, and the transverse aberration of this observation optical system 1 according to the fifth example (which is an afocal system). From FIG. 22 it will be understood that, with this observation optical system 1 according to the fifth example, each of these aberrations is corrected satisfactorily.

And FIGS. 23 through 25 are figures showing the astigmatic aberration and the transverse aberration of the objective optical system 10 according to the fifth example. FIG. 23 shows these aberrations when the negative lens group 122 is not being displaced eccentrically and image shake correction is not being performed, while FIGS. 24 and 25 show these aberrations when the negative lens group 122 is being displaced eccentrically and image shake correction whose amount is 0.6° is being performed. According to FIGS. 23 through 25 it will be understood that, both when image shake correction is not being performed and when it is being performed, both of these types of aberration of the objective optical system 10 are corrected satisfactorily, and that excellent image focusing performance is obtained. Thus it will be evident that, with the overall observation optical system 1 according to this fifth example, both of these types of aberration are corrected, both when image shake correction is not being performed and when it is being performed.

According to the embodiments explained above, the following beneficial operational effects are obtained.

In sequence from the object side, the observation optical system 1 comprises the objective optical system 10, the erecting prism 20, and the ocular optical system 30; in sequence from the object side, the objective optical system 10 comprises the first lens group 11 having a positive refracting power and the second lens group 12 having a negative refracting power; in sequence from the object side, the second lens group comprises the positive lens group 121 and the negative lens group 122; and the image position can be changed by the negative lens group 122 of the second lens group 12 being displaced in a direction orthogonal to the optical axis. Due to this, it is possible to impart high magnification to the negative lens group 122 without making the eccentric aberration during image shake correction worse, so that it is possible to reduce the amount of eccentric displacement of the negative lens group 122. Accordingly it is possible to obtain an adequate amount of image shake correction with a compact structure, and moreover it is possible to reduce the eccentric aberration during image shake correction.

It should be understood that the above explanation has only been given by way of example; the present invention is not to be considered as being limited by any of the structures described above, since it would be possible to arrange to alter the mode of implementation of the present invention in various different ways. For example, it would be acceptable to vary the number of lenses in the various lens groups, the radii of curvature of the lenses, the gaps between the various surfaces, their glass material and so on as appropriate.

What is claimed is:

1. An observation optical system comprising, in sequence from an object side, an objective optical system, an erecting prism, and an ocular optical system, wherein:
    in sequence from the object side, the objective optical system comprises a first lens group having a positive refracting power and a second lens group having a negative refracting power;
    in sequence from the object side, the second lens group comprises a positive lens group having a positive refracting power and a negative lens group having a negative refracting power;
    the negative lens group constitutes an anti-vibration optical system that corrects image shake;
    an image position can be changed by the negative lens group of the second lens group being displaced in a direction orthogonal to an optical axis;
    the negative lens group consists of a single negative lens; and
    the following conditional expressions (1) to (6) are satisfied:

$$0.4 \leq f_1/f \leq 0.9 \quad (1)$$

$$0.5 \leq |f_2/f| \leq 1.4 \quad (2)$$

$$0.2 \leq f_{22}/f_2 \leq 0.6 \quad (3)$$

$$0.01 \leq |D_2/f_2| \leq 0.09 \quad (4)$$

$$-1.2 \leq (r_2+r_1)/(r_2-r_1) \leq -0.8 \quad (5)$$

$$\nu_{22} \geq 50 \quad (6)$$

where
    f is a focal length of the objective optical system,
    $f_1$ is a focal length of the first lens group,
    $f_2$ is a focal length of the second lens group,
    $f_{22}$ is a focal length of the negative lens group of the second lens group,
    $D_2$ is a gap between principal points of the positive lens group and the negative lens group of the second lens group,
    $r_1$ is an object side radius of curvature of the single negative lens,
    $r_2$ is an eye point side radius of curvature of the single negative lens, and
    $\nu_{22}$ is an Abbe number of the single negative lens.

2. The observation optical system according to claim 1, wherein:
    focusing is performed by only the positive lens group of the second lens group being displaced along a direction of the optical axis.

3. An optical device comprising the observation optical system according to claim 1.

4. An observation optical system comprising, in sequence from an object side, an objective optical system, an erecting prism, and an ocular optical system, wherein:
    in sequence from the object side, the objective optical system comprises a first lens group having a positive refracting power and a second lens group having a negative refracting power;
    in sequence from the object side, the second lens group comprises a positive lens group having a positive refracting power and a negative lens group having a negative refracting power;
    the negative lens group constitutes an anti-vibration optical system that corrects image shake;
    an image position can be changed by the negative lens group of the second lens group being displaced in a direction orthogonal to an optical axis; and
    the following conditional expressions (1) and (2) are satisfied:

$$0.4 \leq f_1/f \leq 0.9 \quad (1)$$

$$0.5 \leq |f_2/f| \leq 1.4 \quad (2)$$

where
    f is a focal length of the objective optical system,
    $f_1$ is a focal length of the first lens group, and
    $f_2$ is a focal length of the second lens group.

5. The observation optical system according to claim 4, wherein:
    the following condition (5) is satisfied $$-1.2 \leq (r_2+r_1)/(r_2-r_1) \leq -0.8 \quad (5),$$

where
    $r_1$ is an object side radius of curvature of a first lens of the negative lens group of the second lens group, and
    $r_2$ is an eye point side radius of curvature of a last lens of the negative lens group of the second lens group.

6. The observation optical system according to claim 5, wherein:

focusing is performed by only the positive lens group of the second lens group being displaced along a direction of the optical axis.

7. The observation optical system according to claim 6, wherein:

the following conditions (3) and (4) are satisfied $$0.2 \leq f_{22}/f_2 \leq 0.6 \quad (3)$$

$$0.01 \leq |D_2/f_2| \leq 0.09 \quad (4),$$

where $f_2$ is the focal length of the second lens group,
$f_{22}$ is a focal length of the negative lens group of the second lens group, and
$D_2$ is a gap between principal points of the positive lens group and the negative lens group of the second lens group.

8. The observation optical system according to claim 4, wherein:

focusing is performed by only the positive lens group of the second lens group being displaced along a direction of the optical axis.

9. An optical device comprising the observation optical system according to claim 4.

* * * * *